United States Patent [19]
Kikuchi et al.

[11] Patent Number: 5,576,735
[45] Date of Patent: Nov. 19, 1996

[54] COORDINATES DETECTING APPARATUS WITH DISPLAY UNIT OF A TYPE HAVING SEPARATE CONTROL UNIT

[75] Inventors: Akio Kikuchi; Yasuo Oda, both of Saitama, Japan

[73] Assignee: Kabushiki Kaisha Wakomu, Saitama, Japan

[21] Appl. No.: 208,204

[22] Filed: Mar. 10, 1994

Related U.S. Application Data

[63] Continuation of Ser. No. 867,828, Apr. 14, 1992, abandoned.

[30] Foreign Application Priority Data

Sep. 13, 1991 [JP] Japan .................................. 3-235069

[51] Int. Cl.⁶ ........................................................ G09G 5/00
[52] U.S. Cl. ............................ 345/173; 345/204; 345/211
[58] Field of Search ........................ 178/18, 19; 340/712, 340/728, 731, 811; 382/13; 345/104, 173, 174, 175, 176, 177, 178, 202, 204, 211, 903, 905, 132; 358/412

[56] References Cited

U.S. PATENT DOCUMENTS

| | | | |
|---|---|---|---|
| 4,555,802 | 11/1985 | Fedak et al. | 340/728 |
| 4,630,126 | 12/1986 | Kaku et al. | 358/412 |
| 4,763,356 | 8/1988 | Day, Jr. et al. | 379/368 |
| 4,846,694 | 7/1989 | Erhardt | 345/104 |
| 4,879,666 | 11/1989 | Kembo | 340/731 X |
| 4,985,602 | 1/1991 | Kouhia | 178/18 |
| 5,003,300 | 3/1991 | Wells | 340/705 |
| 5,175,632 | 12/1992 | Hayashi et al. | 358/412 |
| 5,276,458 | 1/1994 | Sawdon | 345/132 |
| 5,329,290 | 7/1994 | Schwarz et al. | 345/132 |

FOREIGN PATENT DOCUMENTS

| | | | |
|---|---|---|---|
| 63-115218 | 5/1988 | Japan . | |
| 2148041 | 5/1985 | United Kingdom | 382/13 |

Primary Examiner—Richard Hjerpe
Assistant Examiner—Kara Farnandez Stoll
Attorney, Agent, or Firm—Lowe, Price, LeBlanc & Becker

[57] ABSTRACT

A coordinate detecting apparatus with a display unit of a type having a separated control unit constituted for the purpose of improving the handling facility of the coordinate detecting apparatus with the display unit, lowering the frequency for transferring data about the contents to be displayed, enabling the circuit for the display control means to be freely designed and also enabling the coordinate detecting apparatus to be connected to an existing computer body. The coordinate detecting apparatus with the display unit is supplied with power from a power source for a control unit, data about the contents to be displayed is supplied from the control unit to the coordinate detecting apparatus with the display unit via one integrated cable while being compressed to form a graphic control signal, the data about the contents to be displayed is restored in the coordinate detecting apparatus with the display unit and the aforesaid function is given to the interface board.

51 Claims, 15 Drawing Sheets

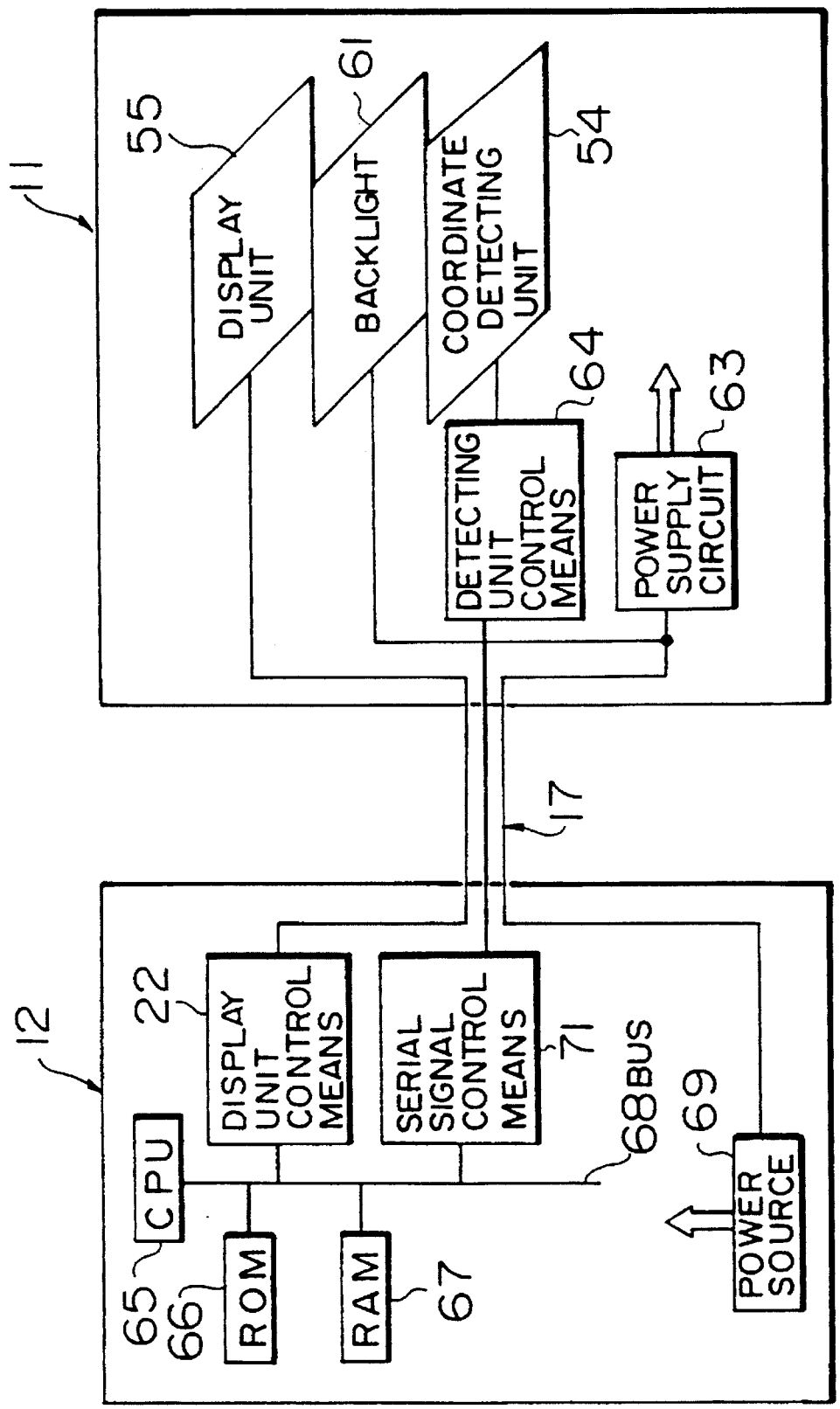

☐ DATA TRANSFERRED FIRST

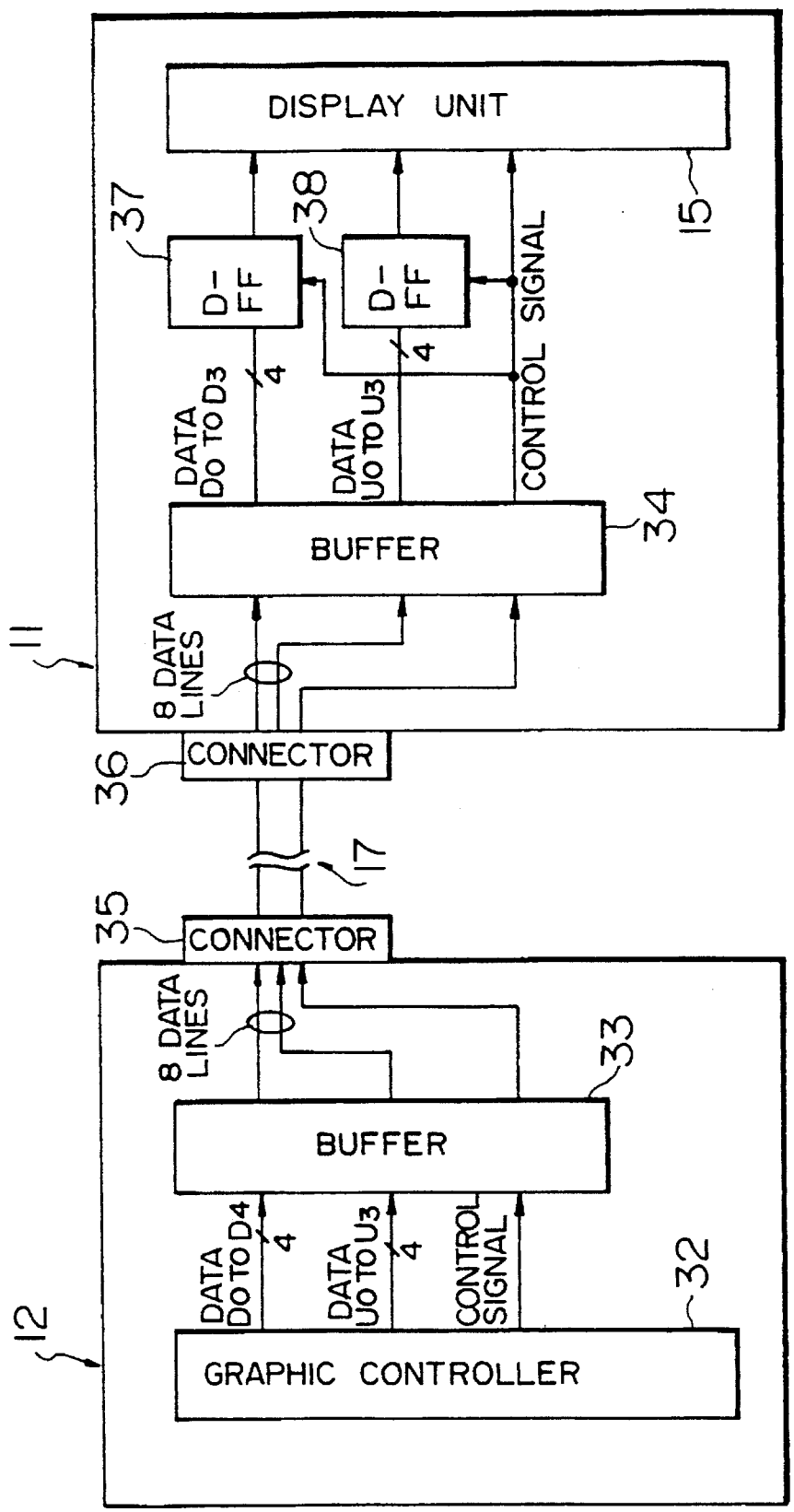

FIG. 12(a)
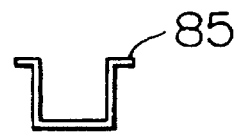
FIG. 12(b)
FIG. 12(c)
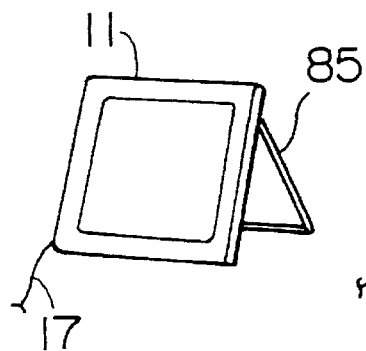
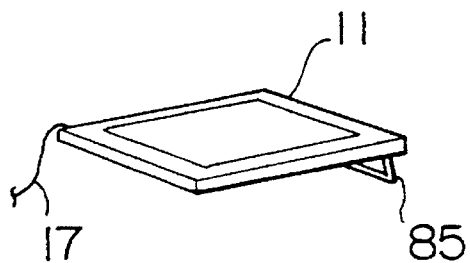
FIG. 12(d)
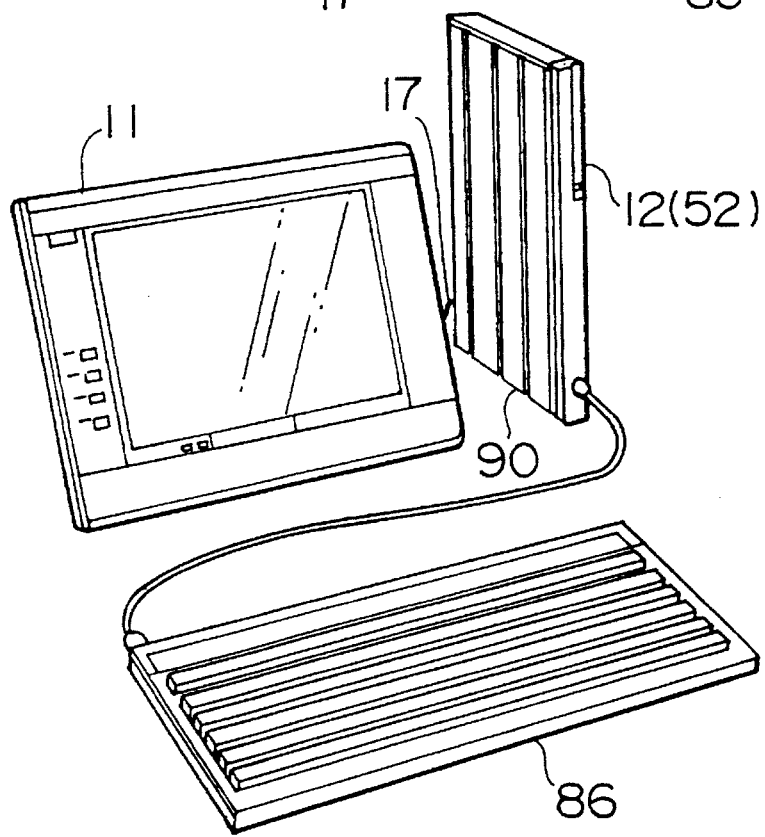

COORDINATES DETECTING APPARATUS WITH DISPLAY UNIT OF A TYPE HAVING SEPARATE CONTROL UNIT

This application is a continuation of application Ser. No. 07/867,828 filed Apr. 14, 1992, now abandoned.

BACKGROUND OF THE INVENTION

1. Field of the Invention

The present invention relates to a coordinate detecting apparatus with a display unit of a type having a separated control unit and arranged in such a manner that the coordinate detecting apparatus with the display unit constituted by superposing a flat type display unit on a coordinate detecting unit is connected to a control unit disposed separably by a means of a cable. More particularly, the present invention relates to a coordinate detecting apparatus with a display unit of a type having a separated control unit having only one connection cable and thereby exhibiting improved handling facility.

2. Related Art Statement

Hitherto, an apparatus of the aforesaid type has been constituted by superposing a plate-like display unit for displaying the contents to be operated by the control unit in a real time manner on a coordinate detecting unit acting as an input unit for inputting data to the control unit. In the aforesaid apparatus, the position indicated by a coordinate indicator is detected, so that coordinate data or data about a handwritten character or the like formed into a numeral is transferred to the control unit via the cable. Furthermore, data about the contents to be displayed supplied from the control unit is received via a cable. An apparatus of this type is disclosed in detail in Japanese Patent Laid-Open No. 63-115218 titled "POSITION DETECTING APPARATUS" filed by the applicant of the present invention.

FIG. 15 is a perspective view of the components of a typical conventional coordinate detecting apparatus with a display unit of a type having a separated control unit. A coordinate detecting apparatus or tablet 51 with a display unit is mainly composed of a coordinate detecting unit disposed in a frame 56 and a display unit 55 superposed on the coordinate detecting unit. In the conventional apparatus shown in FIG. 15, three cables connect the coordinate detecting apparatus 51 with the display unit. That is, a serial signal cable 57 for transmitting/receiving coordinate data or the like to and from a control unit 52 (hereinafter called a computer body, if necessary), a video signal cable 58 for transmitting/receiving data about the contents to be displayed to and from the computer body 52 and a power supply cable 59 through which power is supplied from a power supply unit 53 are connected to the coordinate detecting apparatus 51 with the display unit.

FIG. 16 is a block diagram of an essential portion of the apparatus shown in FIG. 15. The coordinate detecting apparatus 51 with the display unit is mainly composed by superposing the display unit 55 on a coordinate detecting unit 54. The conventional apparatus shown in FIG. 16 further includes a backlight 61 disposed on the reverse side of the display unit 55. Although the display unit 55 may comprise a plasma display or a so-called reflecting type liquid display each of which is not coupled with the backlight 61, the backlight 61 structure shown in FIG. 16 must be used in a case including a so-called transmission type liquid crystal display to attain brightness advantages.

The display unit 55 is controlled by a display unit control means 62 disposed in the frame 56 of the coordinate detecting apparatus 51 with the display unit. The coordinate detecting unit 54 is controlled by a detecting unit control means 64 also disposed in the frame 56. A power supply circuit 63 supplies power required to operate the backlight 61, the display unit control means 62, and the detecting unit control means 64, and the like. The power supply unit 53 converts a domestic 100 or 200 V AC a DC level of about 10 V supplied to the power supply circuit 63 via a power supply cable 59. The power supply circuit 63 converts the 10 volt DC level into proper driving voltage for each of the backlight 61, the display unit control means 62 and the detecting unit control means 64 so as to supply it to these elements.

A CRT control means 70 transfers a video signal representing displayed data to the display unit control means 62 via the video signal cable 58; the video signal is converted into a graphic control signal by the display unit control means 62. As a result, data about the contents to be displayed are displayed on the display unit 55. The display unit control means 62 is connected to the CRT control means 70 in the computer body 52 via the video signal cable 58 so as to transmit/receive the signal which denotes the contents to be displayed. The detecting unit control means 64 is connected via the serial signal cable 57, to a serial signal control means 71 disposed in the computer body 52 so as to transmit/receive a signal which denotes coordinate data or the like.

The computer body 52 comprises a CPU 65 and a bus 68 connected to the CPU 65, the computer body 52 further comprising a ROM 66, a RAM 67, the CRT control means 70 and the serial signal control means 71 respectively connected to the bus 68. The power required for each of the aforesaid circuits is derived from a power source 69. The power source 69 is a power supply means provided independently from the power supply unit 53. In this description, the "CPU" is a central processing unit, the "ROM" is a read only memory memorizing a control program for controlling this apparatus and the like, the "RAM" is a random access memory which stores coordinate data transferred from the coordinate detecting apparatus 51 associated with the display unit and the like and the "CRT" is a display unit having a so-called cathode-ray tube.

Since the conventional coordinate detecting apparatus with the display unit has three cables connected thereto, the aforesaid cables deteriorate the handling facility of the apparatus. That is, there arises a problem in terms of the handling facility at the time of the data input operation and the transportation of the apparatus.

Furthermore, since a relatively high transferring frequency is used in a case where the video signal is employed to transfer data, a countermeasure must be taken against generation of noise affecting the environment.

Another problem arises in that there is an excessive limit in designing the display unit control means such as a liquid crystal controller for receiving a video signal and controlling the display unit as compared with a case where it is directly connected to the bus of the computer body.

SUMMARY OF THE INVENTION

An object of the present invention is to provide a coordinate detecting apparatus with a display unit of a type having a separated control unit which is capable of overcoming the aforesaid problems, in which a control unit and a coordinate detecting apparatus with a display unit can be connected to each other by means of one cable and the frequency for transmitting/receiving data to and from the control unit is reduced, whereby the circuit for the display control means can be freely designed and the handling facility of the coordinate detecting apparatus with the display unit is improved.

Another object of the present invention is to provide an improved interface between an existing computer body and the improved coordinate detecting apparatus with the display unit of a type having a separate control unit.

To achieve the aforesaid object, according to one aspect of the invention, there is provided a coordinate detecting apparatus with a display unit of a type having a separate control unit and constituted by a (1) plate-like display unit serving as an output unit for displaying the contents to be operated by the control unit in a real time manner and superposed on (2) a coordinate detecting unit acting as an input unit for inputting data to the control unit. Thereby, only the control unit and the coordinate detecting apparatus with the display unit are connected to each other by a cable and power for driving the display unit and the coordinate detecting apparatus is supplied from the control unit via the cable.

According to another aspect of the present invention, a display unit control means for transmitting/receiving data about the contents to be displayed is omitted from the coordinate detecting apparatus with the display unit and is directly connected to the bus disposed in the control unit.

According to another aspect of the present invention, the connection cable is one integrated cable.

According to another aspect of the present invention, the coordinate detecting apparatus with the display unit has means for restoring data about the contents to be displayed and transferred from the control unit while being compressed, that is, means for extending the same.

According to another aspect of the present invention, the coordinate detecting apparatus with the display unit is accommodated in a frame formed into a plate-like shape.

According to another aspect of the present invention, the frame has a standing member, which can be folded, on the reverse side or the side surface thereof.

According to another aspect of the present invention, the control unit has a display unit control means.

According to another aspect of the present invention, control data, data about the contents to be displayed and power for driving the display unit and control data, coordinate data and power for driving the coordinate detecting unit are-transmitted/received through one input/output port of the control unit.

According to another aspect of the present invention, the control unit has means for compressing data about the contents to be displayed.

According to another aspect of the present invention, the frame for accommodating the control unit is a box-like frame having the same size as that of the frame of the coordinate detecting apparatus with the display unit.

According to another aspect of the present invention, at least one of the side surfaces of the frame of the control unit is a plane having no operation switch and input/output port and the like.

According to another aspect of the present invention, a member such as a metal fastener or a magnetic sheet is disposed on the reverse side of the frame of the control unit.

According to another aspect of the present invention, there is provided an interface board to be inserted into an extension slot of an existing computer for the purpose of connecting a control unit constituted by the existing computer and the aforesaid coordinate detecting apparatus with the display unit to each other, the interface board having an input/output port for supplying power for driving at least the display unit and the coordinate detecting apparatus.

According to another aspect of the present invention, the interface board has a display unit control means.

According to another aspect of the present invention, control data, data about the contents to be displayed and power for driving the display unit and control data, coordinate data and power for driving the coordinate detecting unit are transmitted/received through one input/output port formed in the interface board.

According to another aspect of the present invention, means for compressing data about the contents to be displayed is disposed on the interface board.

Since the present invention is constituted as described above, the apparatus is not directly connected to a power supply device such as a power supply adapter. Therefore, excellent handling facility can be realized and the apparatus can be easily operated.

Furthermore, the display unit control means is disposed on the control unit or the interface board in place of disposing the display unit control means in the frame of the coordinate detecting apparatus with the display unit. The transferring frequency can be lowered and the circuit for the display unit control means can be further freely designed.

Furthermore, only one connection cable is used to establish a connection between the coordinate detecting apparatus with the display unit and the control unit or the interface board. Therefore, the handling facility can be improved significantly.

In addition, a compression means for compressing data about the contents to be displayed is disposed on the control unit or the interface board and data restoring means is disposed in the coordinate detecting apparatus with the display unit. Therefore, the control unit and the coordinate detecting apparatus with the display unit can be connected to each other by only one cable of the same specification even if the display unit is a low resolution type, an intermediate resolution type, a high resolution type, a monochrome type or a color type display unit.

Furthermore, the frame of the coordinate detecting apparatus with the display unit is formed into a plate-like shape. Therefore, the handling facility as an input device with which input of data to the control unit is performed by hand-writing on a disk or the like can be improved.

In addition, since a standing member, which can be folded, is disposed on the reverse side or the side surface of the frame of the coordinate detecting apparatus with the display unit, the display side can be adjusted in such a manner that it can be seen easily and therefore the handling facility as the display unit can be improved.

Furthermore, since the frame of the control unit is formed into a box-like shape having a size substantially the same as that of the frame of the coordinate detecting apparatus with the display unit, the coordinate detecting apparatus with the display unit can be superposed on the control unit at the time of the operation. Therefore, the handling facility of the coordinate detecting apparatus with the display unit can be improved.

In addition, at least one of the side surfaces of the frame of the control unit is formed into a shape having no operation switch and the input/output ports and the like. Therefore, the control unit can be stood erect while making the aforesaid side face downwards if necessary at the time of the operation. Therefore, the handling facility of the coordinate detecting apparatus with the display unit can be improved.

In addition, since a member such as a metal fastener or a magnetic sheet is disposed on the reverse side of the frame of the control unit, the control unit can be disposed on the side surface or the backside of a disk. Therefore, the operable space on the disk can be enlarged and therefore the handling facility of the coordinate detecting apparatus with the display unit can be improved.

Other and further objects, features and advantages of the invention will be appear more fully from the following description.

BRIEF DESCRIPTION OF THE DRAWINGS

FIG. 2 is a block diagram of a portion of a first preferred embodiment of the present invention shown in FIG. 1;

FIG. 4 is a block diagram of a portion of a preferred apparatus for use in the method shown in FIG. 3;

FIGS. 12(a)–12(d) are structural views which illustrates a fourth embodiment of the present invention;

DESCRIPTION OF THE PREFERRED EMBODIMENTS

Preferred embodiments of the present invention will now be described with reference to the drawings.

Figure 1:
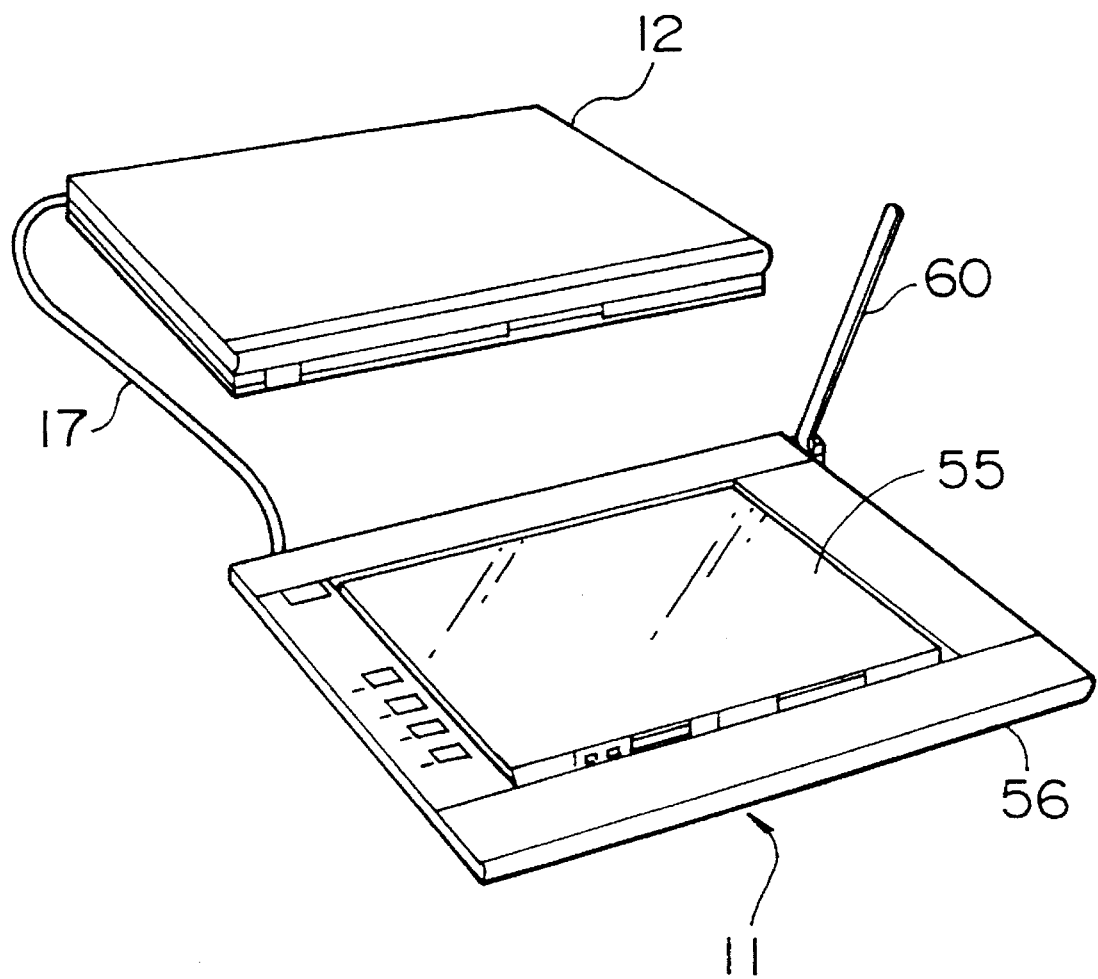
FIG. 1 is a perspective view of the overall structure of a first embodiment of the present invention.
Figure 15:
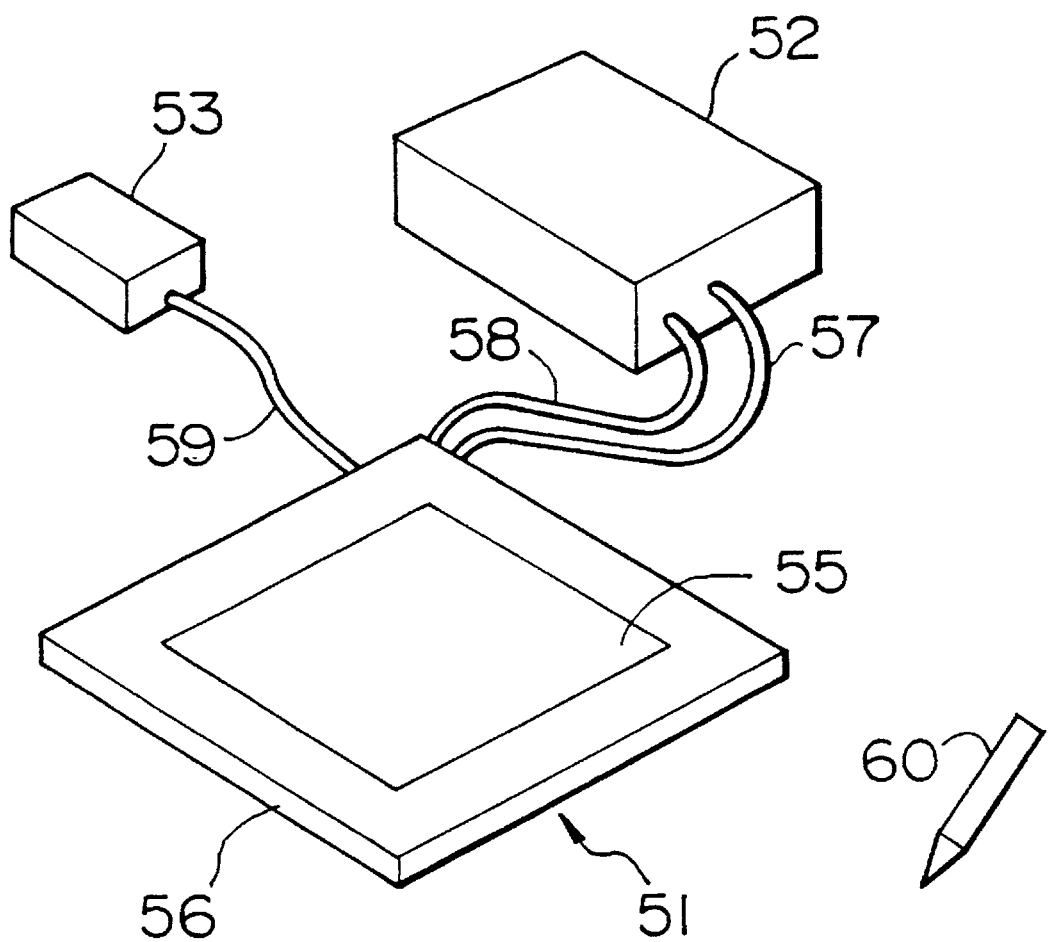
FIG. 15 is a perspective view which illustrates a conventional apparatus.
Figure 16:
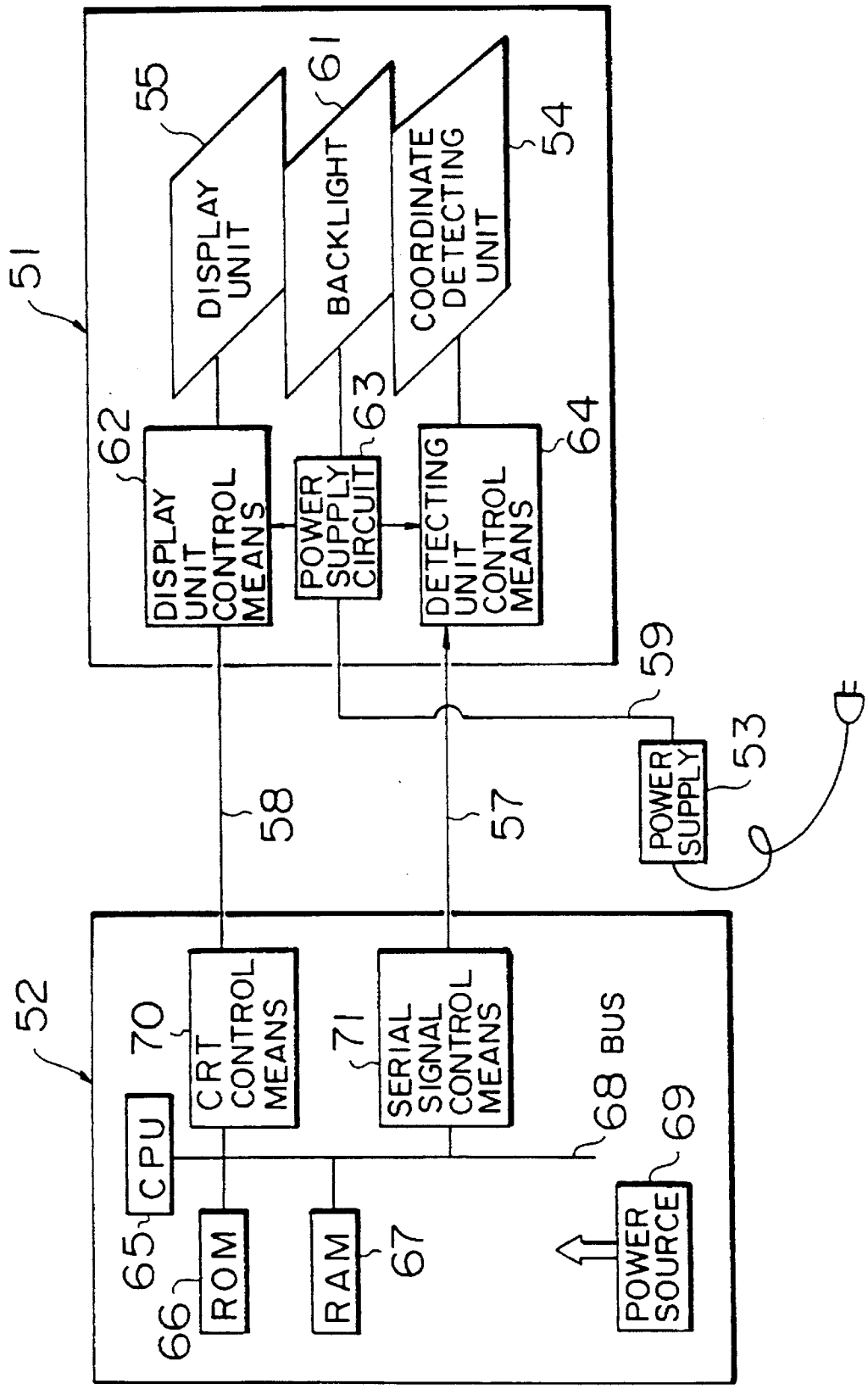
FIG. 16 is a block diagram which illustrates the conventional apparatus.

FIG. 1 is a perspective view of the overall structure of a first embodiment of the present invention. FIG. 2 is a block diagram of an important portion of the embodiment shown in FIG. 1. Referring to FIGS. 1 and 2, the same reference numerals as those shown in FIGS. 15 and 16 represent the same elements. As shown in FIG. 1, a coordinate detecting apparatus 11 with display units is connected to a computer body 12 (that is, a "control unit") by means of an integrated cable 17, a feature of the present invention.

As shown in FIG. 2, the structure of FIG. 1 has been changed so power supply unit 53 for the coordinate detecting apparatus 11 with the display unit is omitted. Furthermore, the power supply unit 69 disposed in the computer body 12 is connected to the power supply circuit 63 disposed in the coordinate detecting apparatus 11 with the display unit via the integrated cable 17. The power supply circuit 63 converts the voltage of the power supplied from the power supply unit 69 disposed in the computer body 12 via the integrated cable 17 into a DC level ranging from several to about 10 V, the voltage level for operating the display unit 55, the backlight 61 and the coordinate detecting unit 4 so as to supply the power to these elements.

Furthermore, the structure of the present invention is arranged in such a manner that the display unit control means is omitted from the coordinate detecting apparatus 11 with the display unit. In addition, a display unit control means 22 for directly transferring the graphic control signal to the display unit 55 by the aforementioned integrated cable 17 is directly connected to the bus 68 located in the computer body 12.

The aforesaid arrangements will cause the following four advantages: first, since a space required to locate the display unit control means 62 in the frame 56 of the coordinate detecting apparatus 11 with the display unit can be omitted, the thickness of the frame 56 of the coordinate detecting apparatus 11 with the display unit can be reduced as compared with the conventional apparatus. As a result, the handling facility of the coordinate detecting apparatus 11 with the display unit can be improved.

A second advantage is that the transference frequency can be and is reduced because the signal denoting the contents to be displayed and reciprocating through the integrated cable 17 can be changed from the video signal to the graphic control signal. This leads to a fact that the connecting cables and the connectors can be further freely designed in a case where a measurement is taken against noise affecting the environment.

The "video signal", i.e., "RGB signal," is an analog signal generally used to transmit/receive data between a CRT display and a computer body. The "graphic control signal" is a digital signal generally used to transfer data to and from a liquid crystal controller liquid crystal display. The video signal is transferred with a frequency of about 30 MHz, while the graphic control signal is transferred at a frequency of several MHz.

A third advantage is now described. The conventional apparatus shown in FIG. 16 must be arranged in such a manner that the display unit control means 62 is capable of converting the video signal into the graphic control signal and therefore an excessive limit presents in designing its electronic circuits. However, the apparatus according to the first embodiment of the present invention provides satisfactory freedom in designing the electronic circuits because the display unit control means 22 is directly connected to the bus 68 disposed in the computer body 68. As a result, an advantage can be gained in that the display unit control means 22 can be satisfactorily easily designed to be a type which is capable of realizing multigradient display of 16 gradations or the like as compared with the conventional apparatus in which the video signal must be converted in the graphic control signal.

As a fourth advantage, since the first embodiment shown in FIG. 2 is arranged in such a manner that the signal which denotes data about the contents to be displayed or the like and transmitted/received through the integrated cable 17 is a digital signal, the rate of data transferred can be increased by making the compression and expansion of data to be performed by a relatively simple circuit such as a flip-flop circuit. This leads to a fact that the coordinate detecting apparatus 11 with the display unit and the computer body 12 can be connected to each other by only one cable of a single type even if the display unit 55 is a low resolution type, an intermediate resolution type, a high resolution type, a monochrome type or a color type display unit.

The other structures are the same as those according to the conventional apparatus shown in FIGS. 15 and 16. That is, the coordinate detecting apparatus 11 with the display unit is constituted in such a manner that the plate-like display unit 55 for displaying the contents of the operations performed in the computer body 12 in a real-time manner, the backlight 61 and the coordinate detecting unit 54 are disposed in the frame 56 while being superposed sequentially. In this state, the position indicated by a coordinate indicator 60 is detected by the coordinate detecting unit 54, coordinate data or the like formed into numeric data is transferred to the computer body and data about the contents to be displayed is transferred to and from the computer body 12.

Then, a second embodiment of the present invention will now be described.

The second embodiment of the present invention is arranged in such a manner that a data compression means and a restoring means are used to enable the coordinate detecting apparatus 11 with the display unit and the computer body 12 to be connected to each other even if the display unit is a high resolution type display by means of the integrated cable 17 having the same specifications as those of the cable 17 which is used in a case where the display unit is the intermediate-resolution type display.

First, a general method of transferring data in a case where the display unit 55 is an intermediate-resolution type display will now be described.

FIG. 3 illustrates a general method of transferring data of the contents to be displayed to an intermediate-resolution type display device 15 (see FIG. 4) of the display unit 55 so as to be displayed on it.

FIG. 4 is a schematic block diagram which illustrates an essential portion of the aforesaid display unit control means 22 showing the number of signal lines for use to transfer data about the contents to be displayed and that of the display unit 55. In FIG. 4, devices which do not directly concern the transference of data of the contents to be displayed, such as the coordinate detecting unit 54 of the coordinate detecting apparatus 11 with the display unit and the CPU 65 of the computer body 12 are omitted from the illustration. Then, description will be made about a case in which data about the contents to be displayed is transferred by a two-frame driving method arranged in such a manner that, in a case where the pixel of the display unit 15 is formed by 640 columns×400 lines, it is sectioned into a lower stage (side D) composed of 200 lines and an upper stage (side U) also composed of 200 lines so as to be displayed while being simultaneously scanned.

Figure 3A:
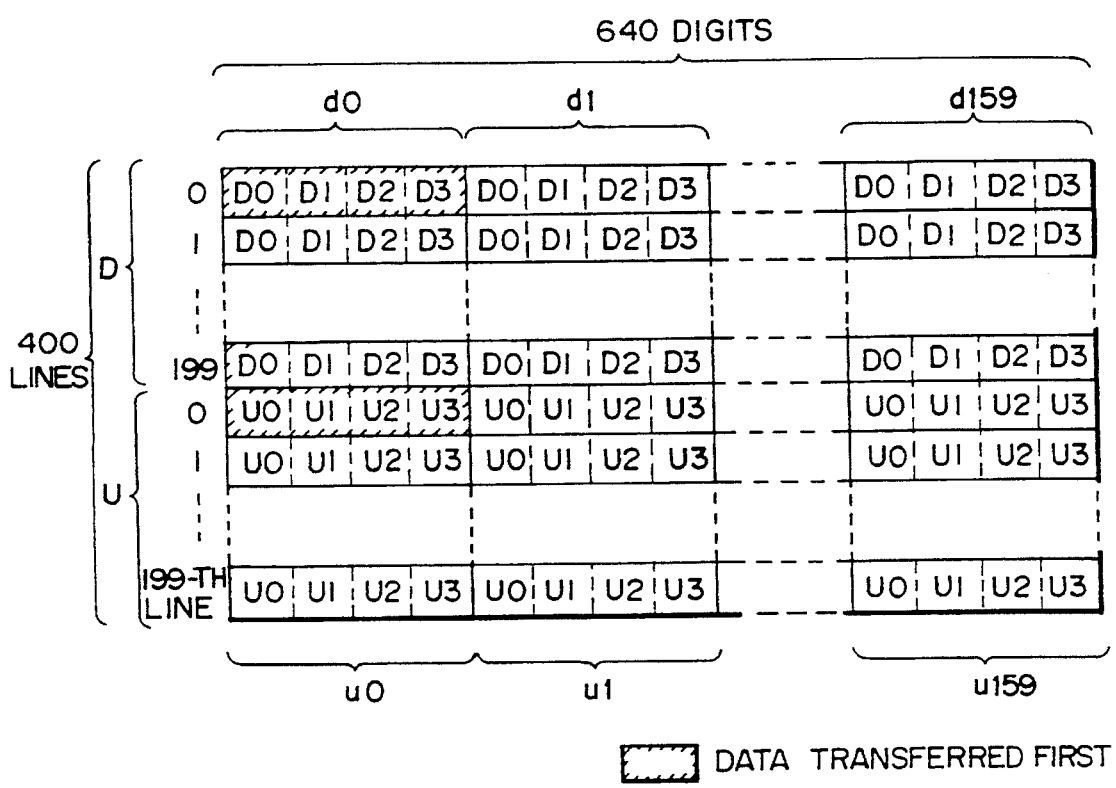
FIGS. 3a and 3b, together, are diagrams helpful in describing a general method of transferring data about the contents to be displayed and employed in a case where the display unit is an intermediate resolution display.

FIG. 3A illustrates data required to display one image plane and disposed on a plane. Referring to FIG. 3A, D0, D1, D2 and D3 represent a four-digit data group in the lower stage to be transferred by one time and d0, d1, d2, . . . , d159 represent the transferring numbers of the data groups in one line of the lower stage to be transferred. Similarly referring to FIG. 3A, U0, U1, U2 and U3 represent a four-digit data group in the upper stage to be transferred by one time and u0, u1, u2, . . . , u159 represent the transferring numbers of the data groups in one line of the upper stage to be transferred.

That is, four digits of data about the contents to be displayed for each of the upper and the lower stages are transferred at one time. Therefore, the transference of one line is completed by 160 times. The "one time" means a transference of data in one period of a data transferring clock signal of control signals. The lower and upper four digits data items D0, D1, D2, D3, U0, U1, U2 and U3 are transferred from the graphic controller 32 to the buffer 33. The aforesaid data items are, via a connector 35, transferred to the coordinate detecting apparatus 11 with the display unit through 8 signal lines disposed in the aforesaid integrated cable 17. The data items are received by the coordinate detecting apparatus 11 with the display unit via a connector 36 and a buffer 34. The operational timing of a D-type flip-flop is controlled in response to graphic signals such as a vertical-scanning start signal and a horizontal-scanning start signal supplied from the graphic controller 32 and the data about the contents to be displayed is displayed on the display unit 15. It can be understood that 8 data lines must be required for the intermediate-resolution display unit to transfer the data about the contents to be displayed.

Figure 3B:
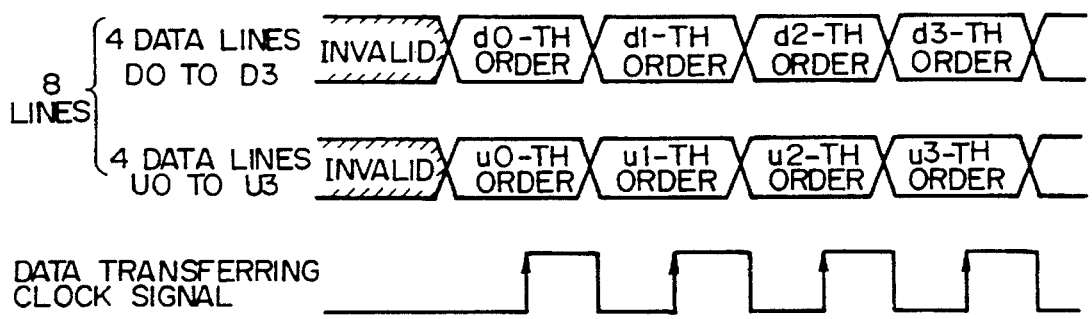

FIG. 3B illustrates the configuration of data to be transferred on a time base. At the first transition of the data transferring clock signal, the d0-th and u0-th data items are transferred. At the second transition of the data transferring clock signal, the d1-th and u1-th data items are transferred. Similarly, at the 160-th transition of the data transferring clock signal, the d159-th and u159-th data items are transferred. Thus, the transference of data on the 0-th line of the lower stage and that on the 0-th line of the upper stage are completed. Therefore, the data transferring clock signal must rise 32,000 times, which is a value obtained by multiplying 160 by 200, to complete the transference of all of the 200 lines in the lower stage and the 200 lines in the upper stage. Since the transferring frequency is about several Mhz as described above, the data of the contents to be displayed is transferred at a speed at which the image plane is reloaded by about 100 times per second.

Then, a general data transferring method employed in a case where the display unit 55 is a high resolution display will now be described.

FIG. 5 illustrates a general method of transferring data about the contents to be displayed to the high resolution type display unit 15 (see FIG. 6) of the display unit 55 so as to be displayed on it.

Figure 6:
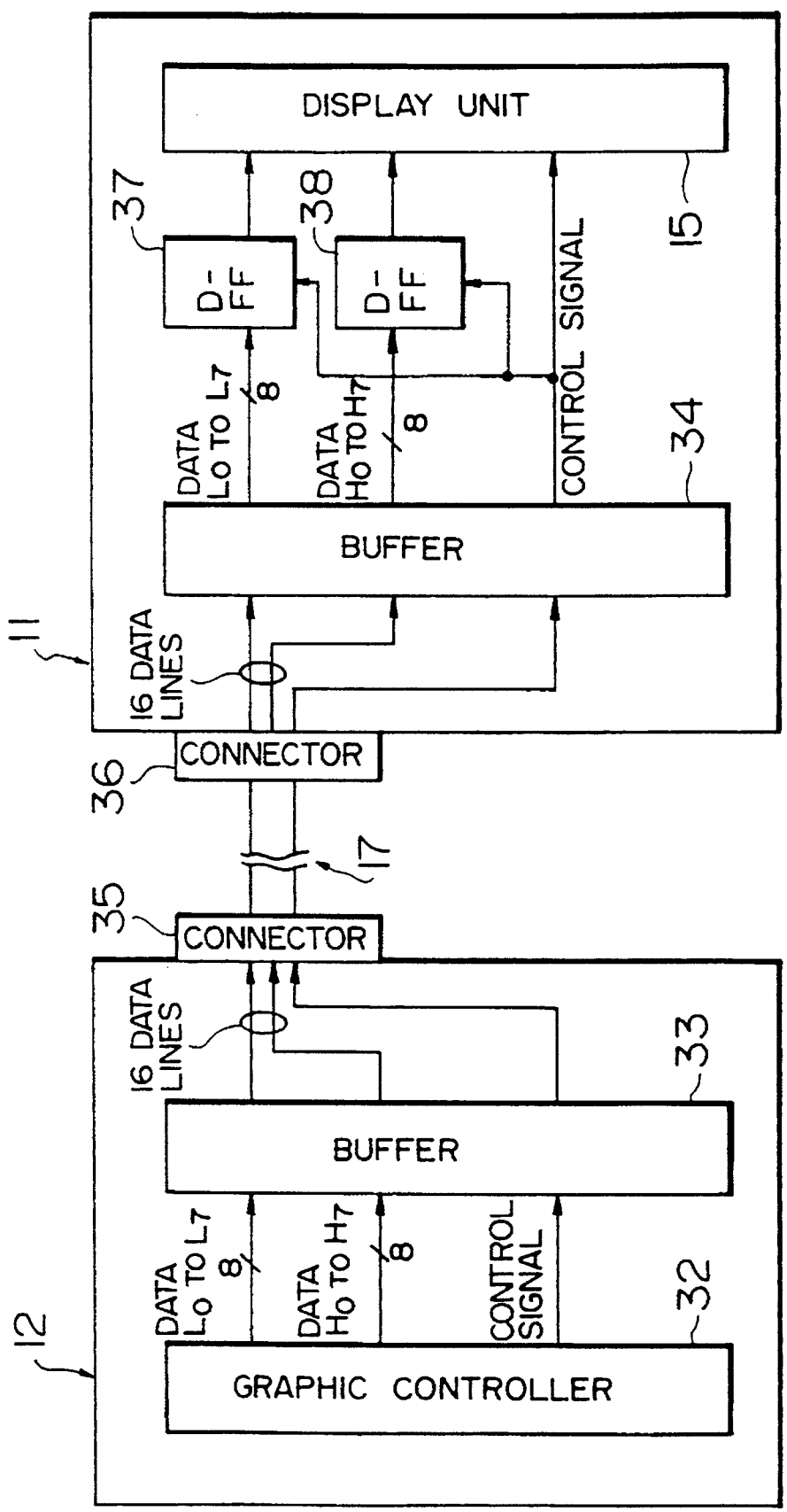
FIG. 6 is a block diagram of a portion of an apparatus used to perform the method of FIG. 5.

FIG. 6 is a block diagram which illustrates an essential portion of the display unit control means 22 showing the number of the signal lines for use to transfer data about the contents to be displayed and that of the display unit 15. In FIG. 6, devices which do not directly concern the transference of data of the contents to be displayed, such as the coordinate detecting unit 54 of the coordinate detecting apparatus 11 with the display unit and the CPU 65 of the computer body 12 are omitted from the illustration. Then, description will be made about a case in which data about the contents to be displayed is transferred by a two-frame driving method arranged in such a manner that, in a case where the display of the display unit 15 is formed by pixels arranged in 1,280 columns ×780 lines, it is sectioned into a lower stage (side D) composed of 390 lines and an upper stage (side U) also composed of 390 lines so as to be displayed while being simultaneously scanned.

Figure 5A:
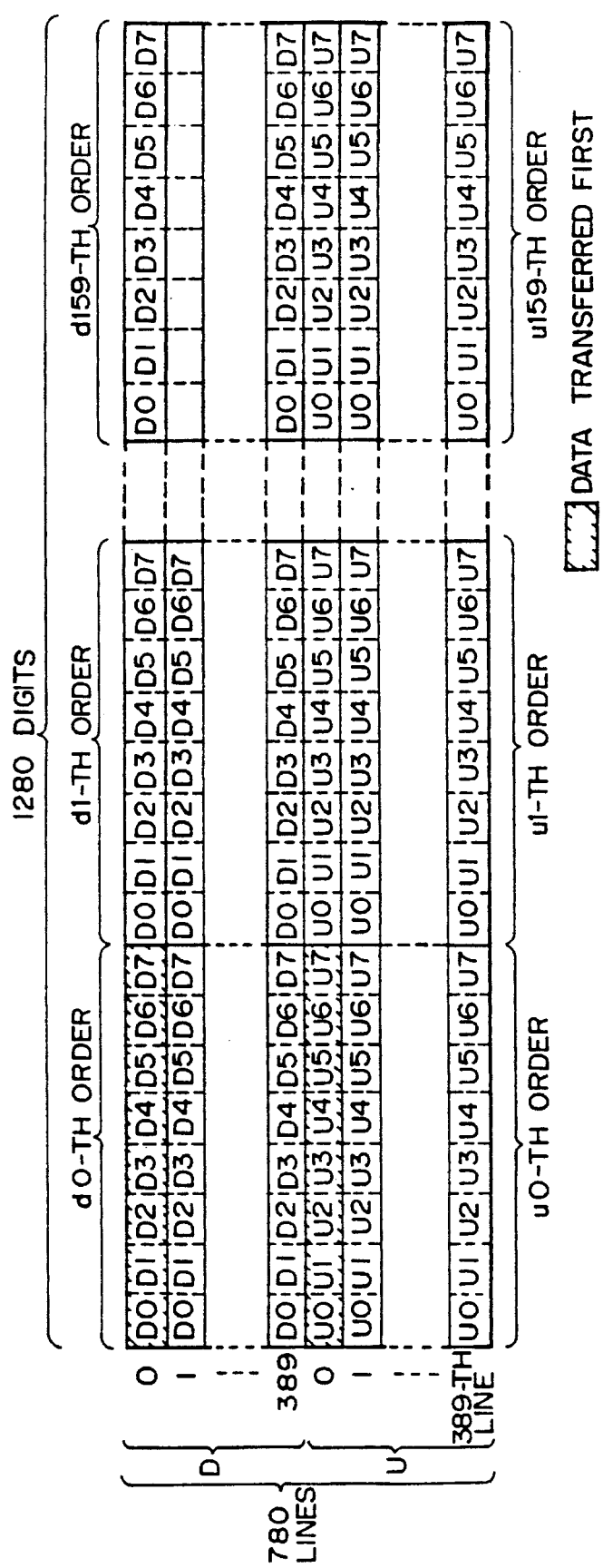
FIGS. 5a and 5b, together, are diagrams helpful in describing a general method of transferring data about the contents to be displayed and employed in a case where the display unit is a high resolution display.

FIG. 5A illustrates data required to display one image plane and disposed on a plane. Referring to FIG. 3A, D0, D1, D2, D3, D4, D5, D6 and D7 represent an eight-digit data group in the lower stage to be transferred by one time and d0, d1, d2, ..., d159 represent the transferring numbers of the data groups in one line of the lower stage to be transferred. Similarly referring to FIG. 5A, U0, U1, U2, U3, U4, U5, U6 and U7 represent an eight-digit data group in the upper stage to be transferred by one time and u0, u1, u2, ..., u159 represent the transferring numbers of the data groups in one line of the upper stage to be transferred.

That is, 8 digits of data about the contents to be displayed for each of the upper and the lower stages are transferred at one time. Therefore, the transference of one line is completed by 160 times. The "one time" means a transference of data in one period of a data transferring clock signal of control signals. The lower and upper four digits data items D0, D1, D2, D3, D4, D5, D6, D7, U0, U1, U2, U3, U4, U5, U6 and U7 are transferred from the graphic controller 32 to the buffer 33. The aforesaid data items are, via a connector 35, transferred to the coordinate detecting apparatus 11 with the display unit through 16 signal lines disposed in the aforesaid integrated cable 17. The data items are received by the coordinate detecting apparatus 11 with-the display unit via the connector 36 and the buffer 34. The operational timing of the D-type flip-flop is controlled in response to graphic signals such as a vertical-scanning start signal and a horizontal-scanning start signal supplied from the graphic controller 32 and the data about the contents to be displayed is displayed on the display unit 15. It can be understood that 16 data lines must be required for the high-resolution display unit to transfer the data about the contents to be displayed.

Figure 5B:
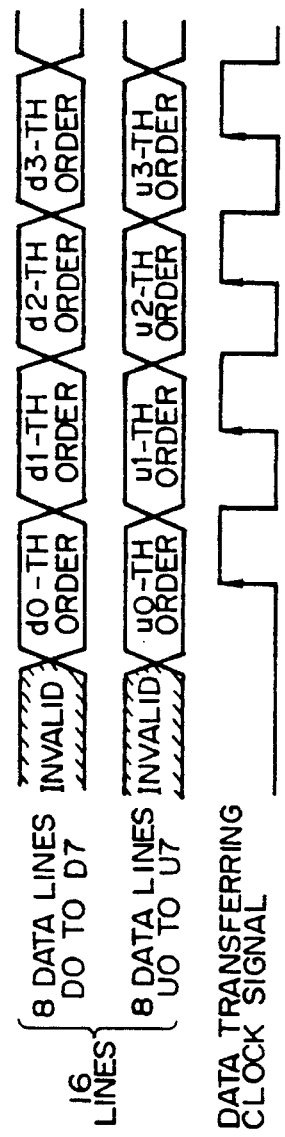

FIG. 5B illustrates the configuration of data to be transferred on a time base. At the first transition of the data transferring clock signal, the d0-th and u0-th data items are transferred. At the second transition of the data transferring clock signal, the d1-th and u1-th data items are transferred. Similarly, at the 160-th transition of the data transferring clock signal, the d159-th and u159-th data items are transferred. Thus, the transference of data on the 0-th line of the lower stage and that on the 0-th line of the upper stage are completed. Therefore, the data transferring clock signal must rise 62,400 times, which is a value obtained by multiplying 160 by 390, to complete the transference of all of the 390 lines in the lower stage and the 390 lines in the upper stage. Since the transferring frequency is about several Mhz as described above, the data of the contents to be displayed is transferred at a speed at which the image plane is reloaded by about 100 times per second.

Figure 7:
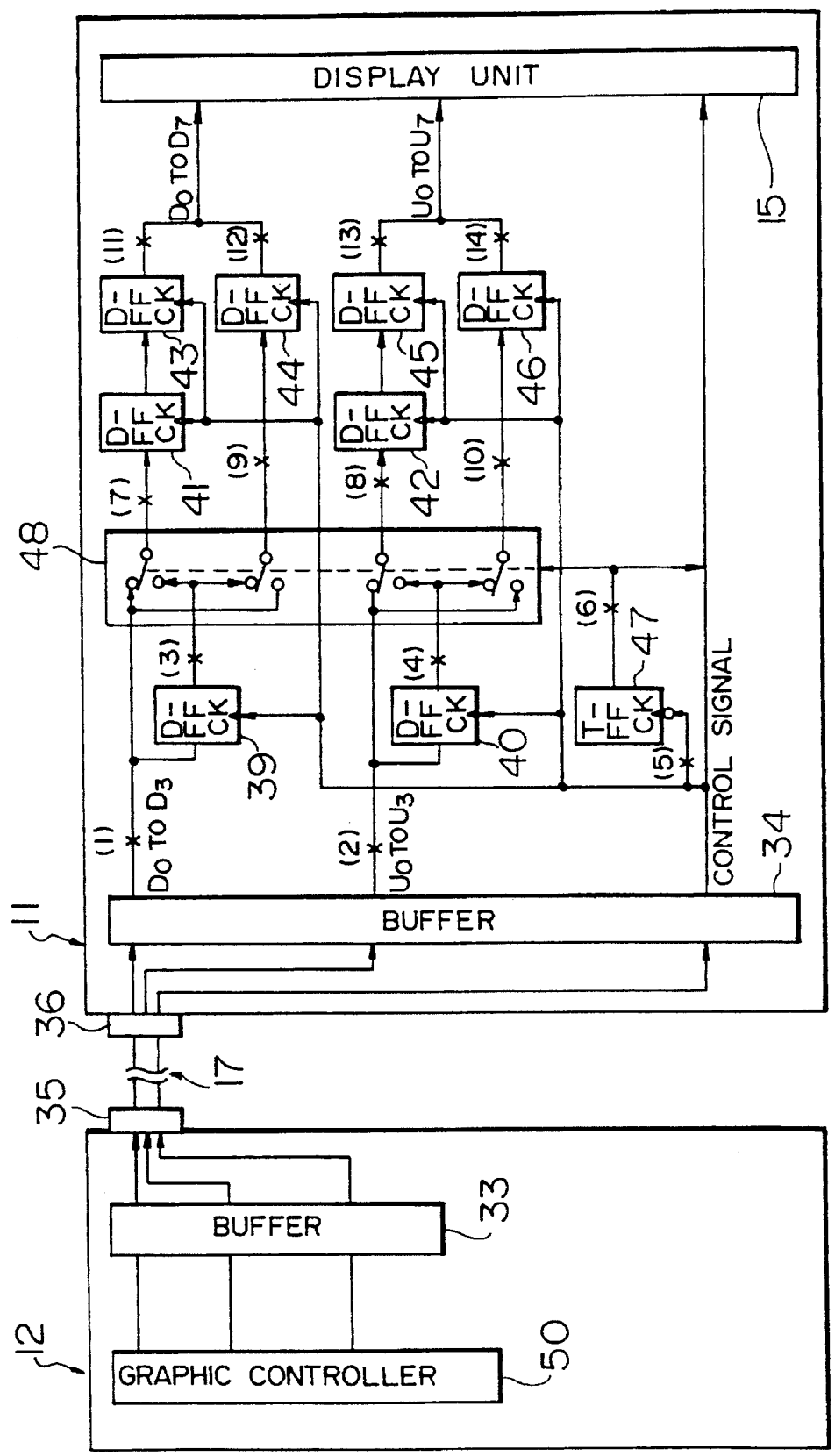
FIG. 7 is a block diagram of a portion of a second embodiment of the present invention.

FIG. 7 is a block diagram which illustrates an essential portion of the second embodiment of the present invention.

The second embodiment of the present invention is arranged in such a manner that a data compression means and a restoring means are used to enable the coordinate detecting apparatus 11 with the display unit and the computer body 12 to be connected to each other even if the display unit 55 is a high resolution type display by means of the integrated cable 17 having the same specifications as those of the cable 17 which is used in a case where the display unit 55 is the intermediate-resolution type display.

Referring to FIG. 7, the computer body 12 includes a graphic controller 50 for generating a frequency which is two times that used in the cases respectively shown in FIGS. 4 and 6 for the purpose of compressing data about the contents to be displayed and transferred to the coordinate detecting apparatus 11 with the display unit, the frequency being frequency for transferring data about the contents to be displayed. The coordinate detecting apparatus 11 with the display unit includes a restoring circuit constituted by connecting D-type flip-flops 39 to 46, a T-type flip-flop 47 and a switch 48 in a manner as shown in FIG. 78 for the purpose of restoring transferred data about the contents to be displayed. In FIG. 7, devices which do not directly concern the transference of data of the contents to be displayed, such as the coordinate detecting unit 14 of the coordinate detecting apparatus 11 with the display unit and the CPU 65 of the computer body 12 are omitted from the illustration.

Figure 8:
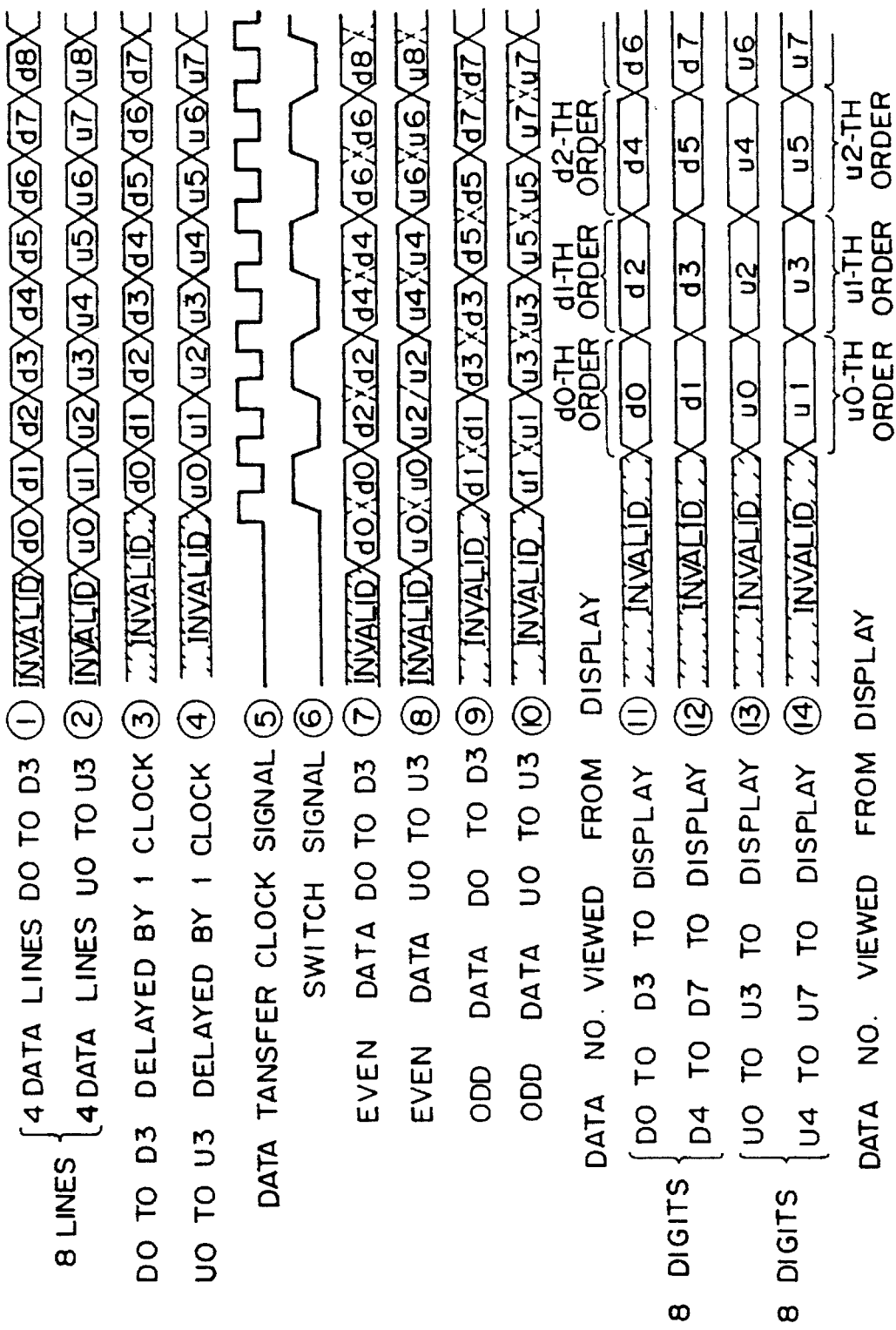
FIG. 8 includes waveforms at designated points in FIG. 7.

FIG. 8 illustrates waveforms of the signal shown at points (1) to (14) shown in FIG. 7 in such a manner that waveforms (1) to (14) correspond to the aforesaid points.

Figure 9A:
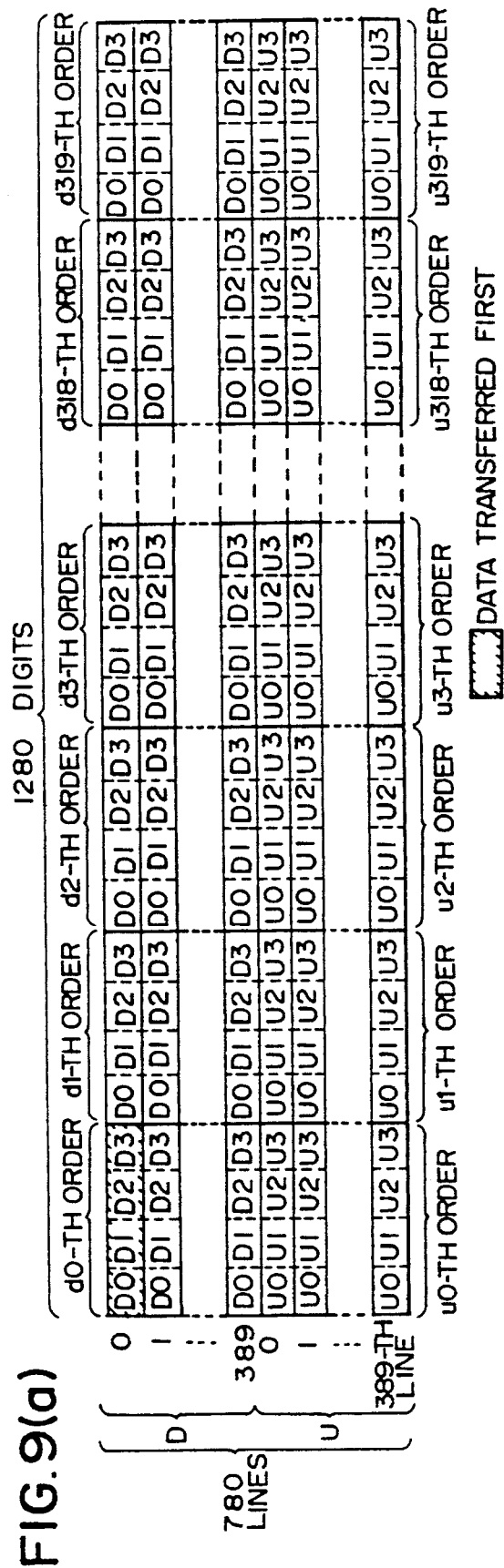
FIGS. 9a and 9b illustrates a state where data about the contents to be displayed is compressed and a state where the same is restored realized in the second embodiment of the present invention.
Figure 9B:
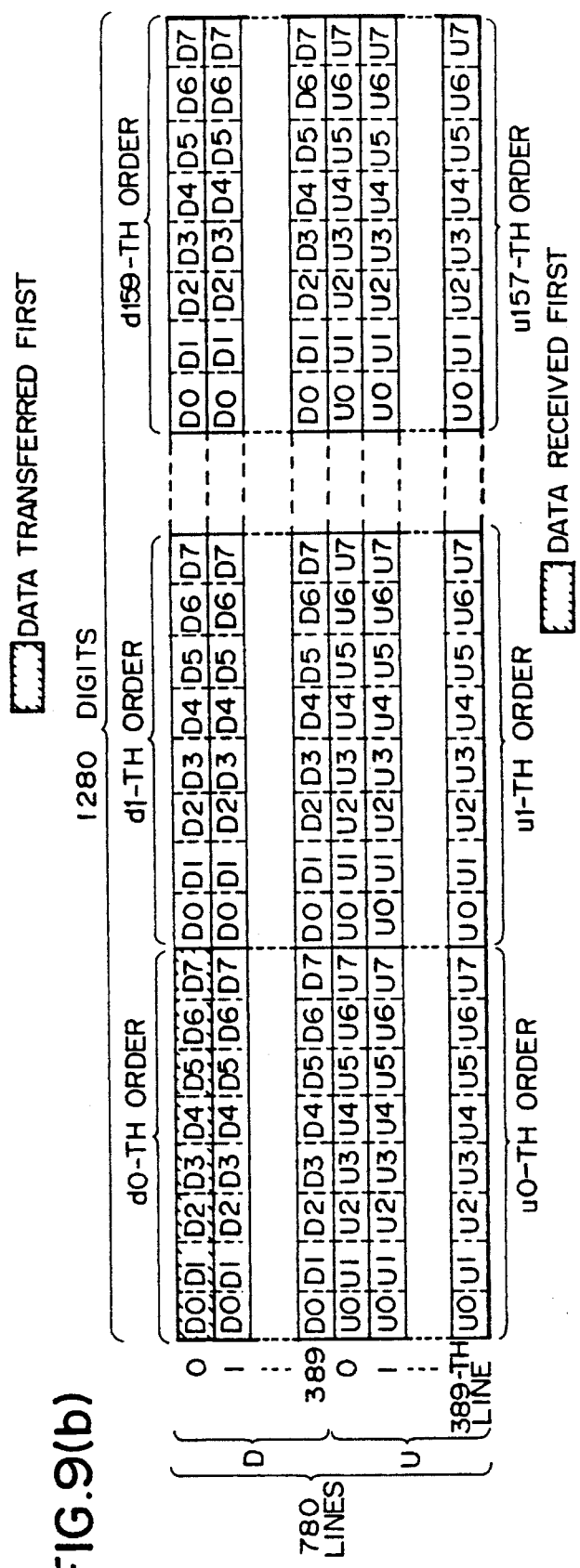

FIG. 9 illustrates a state where data about the contents to be displayed at the high resolution shown in FIG. 5 has been compressed and a state where the same has been restored, the states being illustrated in a manner of a plane configuration. FIG. 9A illustrates compressed data about the contents to be displayed and FIG. 9B illustrates restored data about the contents to be displayed.

Then, a characterized operation of the second embodiment of the present invention thus constituted will now be described.

Similarly to the case of the intermediate resolution shown in FIG. 3, the graphic controller 50 disposed in the computer body 12 collectively transfers four-digit data D0, D1, D2 and D3 to be displayed and disposed in the lower stage and four-digit data U0, U1, U2 and U3 to be displayed and disposed in the upper stage as shown in FIG. 9A. The aforesaid transference is performed at a speed which is two times that in the case of the intermediate resolution. Also the number of the data transference times is doubled. As a result, the signal lines for transferring data about the contents to be displayed can be reduced to 8 lines composed of four lines for the lower stage and four lines for the upper stage. Therefore, a cable of the same specifications as those of the integrated cable used in the display unit for the intermediate resolution can be used. That is, by doubling the transferring frequency realized by the graphic controller 50, data about the contents to be displayed can be compressed.

FIG. 9B illustrates a state where data about the contents to be displayed, compressed as described above and transferred to the coordinate detecting apparatus 11 with the display unit has been compressed similarly to the case shown in FIG. 5. The restoring operation will now be described with reference to the restoring circuit shown in FIG. 7 and the signal waveforms at the points shown in FIG. 8.

That is, 4-digit data 1 composed of D0, D1, D2 and D3 in the lower stage is transferred in parallel through the four signal lines. An object of this restoring circuit is to restore data as follows (see FIG. 9): data items of 4-digit data items transferred at even orders and having transferring numbers d0-th order, d2-th order, d4-th order, ..., and d318-th order and the like correspond to the lower 4-digit data D0, D1, D2 and D3 of 8-digit data D0, D1, D2, D3, D4, D5, D6 and D7 in the display unit 15; and data items transferred at odd orders and having transferring numbers d1-th order, d3-th order, d5-th order, ..., and d319-th order and the like correspond to the upper 4-digit data D4, D5, D6 and D7 of 8-digit data in the display unit 15. Data 2 composed of 4-digit data U0, U1, U2 and U3 in the upper stage is also restored.

A data transferring clock signal (5) of the clock signals is supplied to a CK terminal (clock terminal) of the D-type flip-flop 39 and data (3) delayed from data (1) by one clock is transmitted. Similarly, data (4) delayed from data (2) by one clock is transmitted from the flip-flop 40.

Furthermore, the data transferring clock signal (5) is supplied to a CK terminal of the T-type flip-flop 47. The flip-flop 47 transmits a switch signal (6) to the switch 48. The switch 48 simultaneously switches four contacts in response to the switch signal (6).

The switch 48, as data (7), selects only even-number data items such as d0, d2, d4, ..., d318 in order to receive data (1) when the transferring number is the even number and receives data (3) when the transferring number is the odd number. The aforesaid case of the even order means a moment at which the even order data items about the contents to be displayed and having the transferring numbers d0, d2, d4, ..., d318 and the like pass, while the case of the odd order means a moment at which the odd order data items about the contents to be displayed and having the transferring numbers d1, d3, d5, ..., d319 and the like pass.

Similarly, as output data (9) from the switch 48, only odd number data items such as d1, d3, d5, ..., d319 and the like are selected. The switch 48 similarly selects data items as output data items (8) and (10) in such a manner that only even order data items such as u0, u2, u4, ..., u318 and the like are selected as data (8) and only odd number data items such as u1, u3, u5, ..., u319 and the like are selected as data (10).

Since each switching of data (7), (8), (9) and (10) generates switch noise, they are caused to pass through the D-type flip-flops 41, 42, 44 and 46 so as to be rectified. Since even order data (7) and (8) are transferred faster by one clock, they are caused to pass through the D-type flip-flops 43 and 45 to pass at the same timing as that for the odd number data items.

Thus, data restored to 8 digits is supplied to the display unit 15 while making data items (11) and (13) given the even transferring numbers to be the lower four digits and data items (12) and (14) given the odd transferring numbers to be the upper four digits in such a manner that data items (11) and (12) are lower stage data and data items (13) and (14) are upper stage data.

That is, d0-th order data and d1-th order data at the time of the transmission are coupled to each other so as to be d0-th order data at the time of receipt by the display unit 15. On the other hand, d2-th order data and d3-th order data at the time of the transmission are coupled to each other so as to be d1-th order data at the time of receipt by the display unit 15. Similarly, d318-th order data and d319-th order data at the time of the transmission are coupled to each other so as to be d159-th order data at the time of receipt by the display unit 15.

Thus, data in the state shown in FIG. 9A is restored to the state shown in FIG. 9B.

As described above, even if the display unit 15 is a high resolution type display, the data compression and restoration enable the coordinate detecting apparatus 11 with the display unit and the computer body 12 to be connected to each other by using a cable having the same specifications as those of the cable which is used in a case where the display unit 15 is the intermediate-resolution type display.

Table illustrates the specifications in a case where the number of pins of the connector is made to be 26. Although the way of using the pins, of course, is not limited to the following description, the table shows a fact that data can be transferred in a case of a high resolution by using the cable having the same specification as those of the cable for use in the case of the intermediate resolution.

TABLE

| Pin No. | Name of Signal |
| --- | --- |
| 1 | OUTPUT OF + 15 V |
| 2 | OUTPUT OF + 15 V |
| 3 | RESET SIGNAL |
| 4 | SWITCH SIGNAL |
| 5 | VERTICAL SCAN START SIGNAL |
| 6 | DATA LATCH SIGNAL at the time of the high resolution and a color display (GND in a case of the intermediate resolution) |
| 7 | HORIZONTAL SCAN START SIGNAL |
| 8 | GND |
| 9 | DATA TRANSFERRING CLOCK SIGNAL |
| 10 | GND |
| 11 | DISPLAY DATA (upper frame) 0 |
| 12 | DISPLAY DATA (upper frame) 1 |
| 13 | DISPLAY DATA (upper frame) 2 |
| 14 | DISPLAY DATA (upper frame) 3 |
| 15 | DISPLAY DATA (lower frame) 0 |
| 16 | DISPLAY DATA (lower frame) 1 |
| 17 | DISPLAY DATA (lower frame) 2 |
| 18 | DISPLAY DATA (lower frame) 3 |
| 19 | TRANSMISSION DATA |
| 20 | RECEIPT DATA |
| 21 | TRANSMISSION COMMAND SIGNAL |
| 22 | TRANSMISSION ENABLE SIGNAL |
| 23 | DATA SET READY SIGNAL |
| 24 | TERMINAL EQUIPMENT READY SIGNAL |
| 25 | GND |
| 26 | GND |

The No. 1 pin and the No. 2 pin shown in the table are used to supply power. The No. 5 pin to the No. 9 pin are used to pass the display unit control signal. The display unit control signal is a liquid crystal control signal in a case where the display unit is, for example, a liquid crystal display. The No. 11 to No. 18 pins are used to transfer the 8-digit contents to be displayed and composed of the four digits in the upper frame and the four digits in the lower frame. The No. 19 to No. 24 pins are used to perform a serial communication between the coordinate detecting unit 14 of the coordinate detecting apparatus 11 with the display unit and a serial signal control means 31 of the computer body 12.

Each of the aforesaid embodiments is arranged by improving the structure of the computer body. Furthermore, since the coordinate detecting apparatus 11 with the display unit according to the present invention is an input/output apparatus connected the computer body by means of only the integrated cable 17 and therefore it is an apparatus exhibiting excellent handling facility, an advantage can be obtained in that the existing facility can be improved if the coordinate detecting apparatus 11 with the display unit according to the present invention can be connected to an existing computer body as well as the advantage obtainable in a case where the computer body is newly designed. In general, the computer body has so-called extension slots directly connected to the bus or the like, so that a memory and/or an input/output port can be additionally provided. Therefore, an interface board constituted in such a manner that it can be inserted into the extension slot formed in the existing computer body enables the coordinate detecting apparatus 11 with the display unit according to the present invention to be connected to the computer body.

Figure 10:
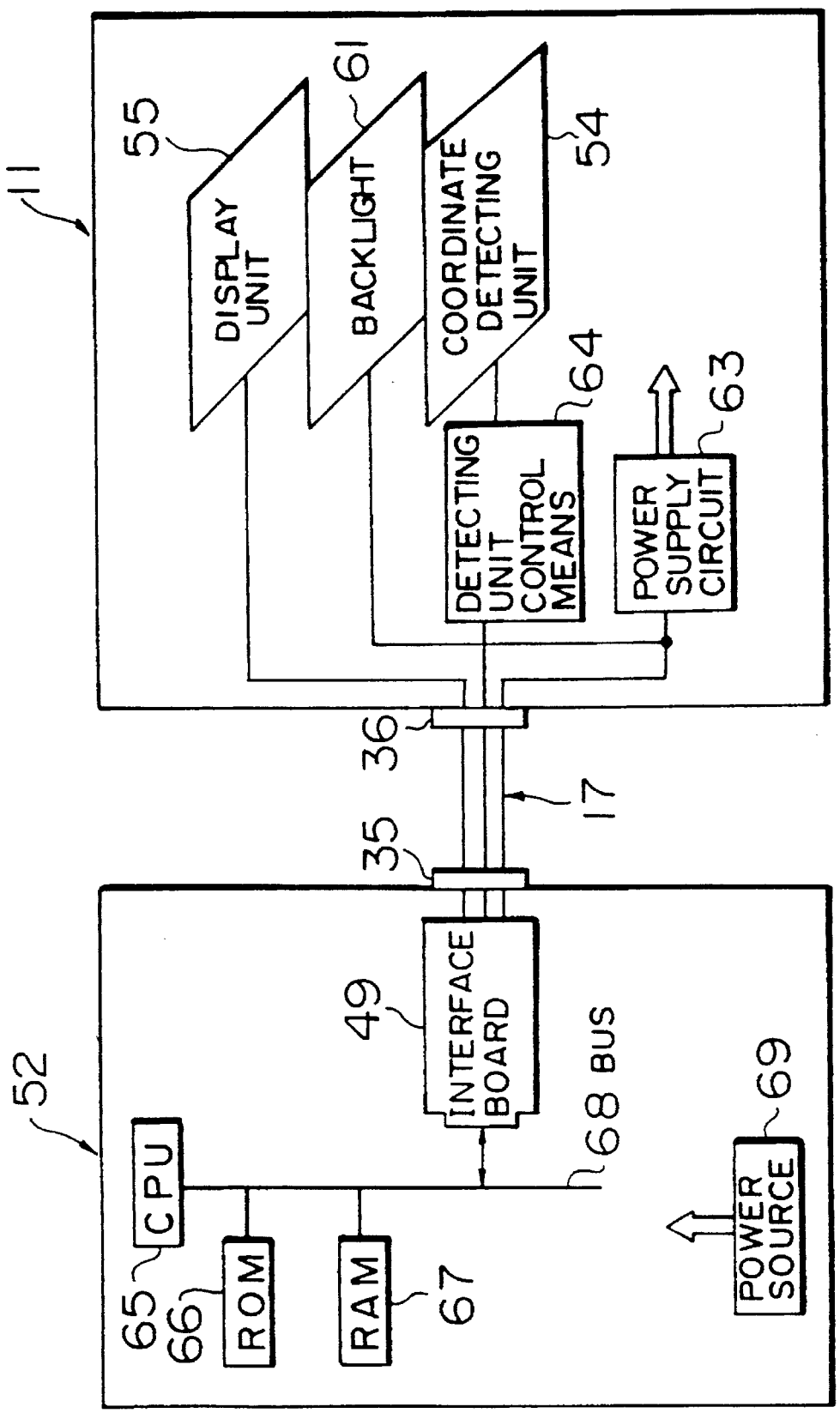
FIG. 10 is a block diagram which illustrates a third embodiment of the present invention.
Figure 11:
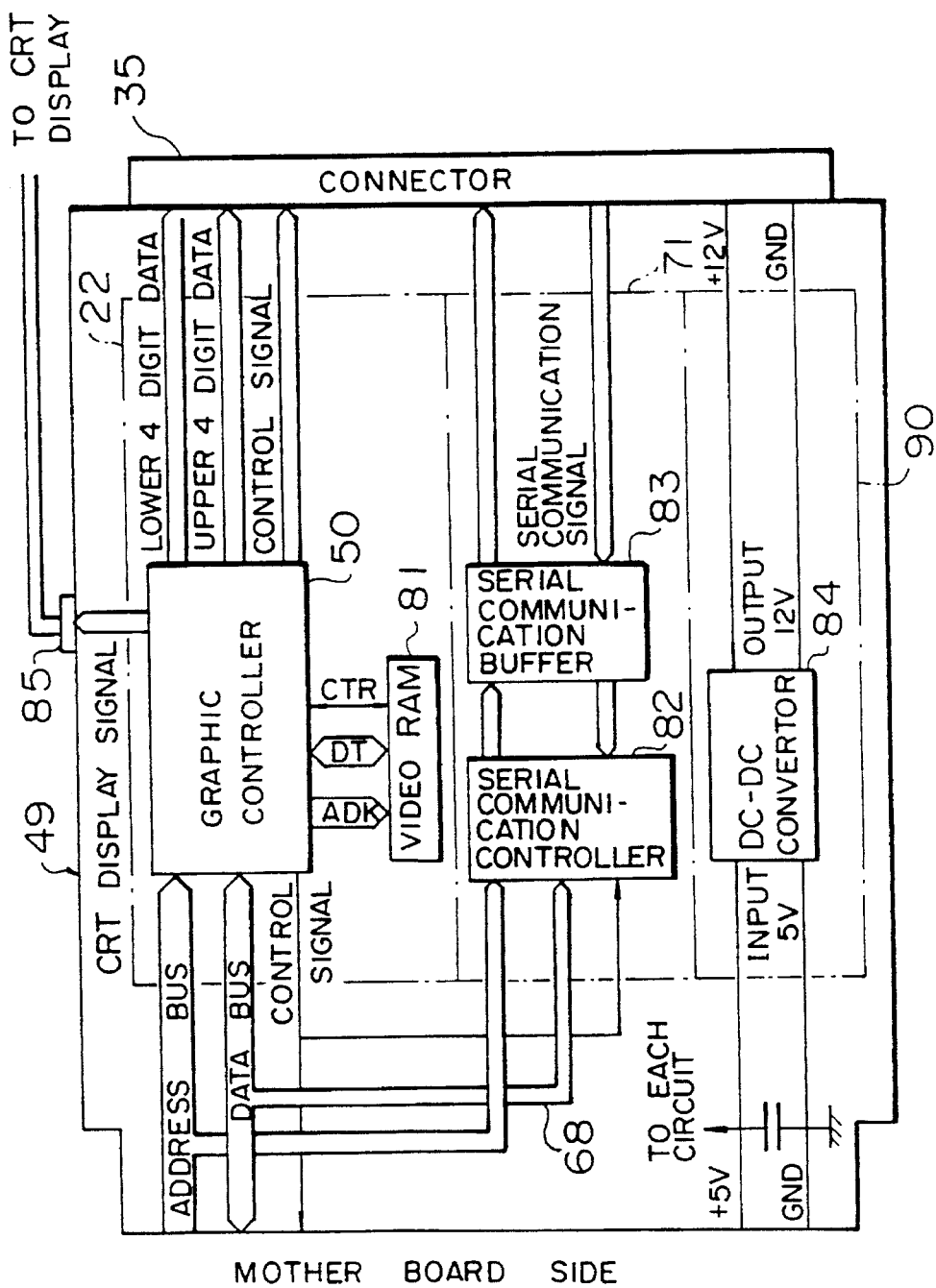
FIG. 11 is a block diagram which illustrates an essential portion of an interface board according to a third embodiment of the present invention.

FIG. 10 is a block diagram which illustrates a third embodiment of the present invention in which an interface board 49 is inserted into the extension slot of an existing computer body. FIG. 11 is a block diagram which illustrates an essential portion of the interface board 49. Referring to FIGS. 10 and 11, elements given the same reference numerals as those shown in FIGS. 2, 4, 6 and 7 represent the same elements.

As shown in FIG. 10, the interface board 49 according to the third embodiment of the present invention is a board which can be inserted/ejected from the extension slot of the existing computer body 52. When the interface board 49 is inserted, it is electrically connected to the bus 68 and is supplied with power from the power source 69. When the interface board 49 is connected to the integrated cable 17 via the connector 35, an interface between the coordinate detecting apparatus 11 with the display unit and the existing computer body 52 can be realized.

The interface board 49 shown in FIG. 11 is mainly composed of the display unit control means 22 according to the first and the second embodiments of the present invention, a serial signal control means 71 and a power supply circuit 90.

The interface board 49 is connected to the mother board side, that is, the substrate on which the CPU 65 of the computer body 52 and the like are mounted so as to transmit/receive an address signal, a data signal and a control signal and the like. Furthermore, the interface board 49 is supplied with power. The graphic controller 50 having the aforementioned compressing means receives data about the contents to be displayed and the like from the computer body via the bus 68 so as to transmit data about the contents to be displayed and composed of four digits in the lower stage and four digits in the upper stage, the graphic controller 50 further transmitting the control signal. A video RAM 81 is connected to the graphic controller 50 in order to temporarily store data to be controlled by the graphic controller 50. The structure of the embodiment shown in FIG. 11 is constituted in such a manner that a CRT display signal is transmitted from the graphic controller 50 via a connector 85. In this case, it is advantageous when the same frame as that displayed on the display unit 15 of the coordinate detecting apparatus 11 with the display unit is also displayed on a CRT display. However, another embodiment, in which it is omitted from the structure, may be constituted.

Referring to the drawing, reference numeral 82 represents a serial communication controller and 83 represents a serial communication buffer. The aforementioned elements 82 and 83 are provided for the purpose of enabling a serial communication to be performed between the detecting unit control means 64 of the coordinate detecting unit 54 provided for the coordinate detecting apparatus 11 with the display unit and the computer body 52. Specifically, transmission data, receipt data, the transmission command signal, the transmission enable signal, the data set ready signal, and the terminal equipment ready signal which correspond to the No. 19 to No. 24 pins of the connector shown in the table are transmitted/received via the connector.

The power supply circuit 90 has a DC-DC converter 84 which converts +5 V power supplied from the power source 69 to the mother board into +12 V power so as to supply it to the coordinate detecting apparatus 11 with the display unit via the connector 35. Although the conversion to the +12 V is performed according to this embodiment, another embodiment in which a conversion to another voltage level which is required for the backlight 61 and the detecting unit control means 64 in the coordinate detecting apparatus 11 with the display unit may be constituted. Another structure may be employed in which all of the functions of the power supply circuit 90 are given to the coordinate detecting apparatus 11 with the display unit in place of the first and the second embodiments in each of which the power supply circuit 90 is not disposed on the interface board 49.

As described above, the present invention enables the computer body and the coordinate detecting apparatus with the display unit to be connected to each other by one integrated cable as compared with the conventional apparatus which must have three connection cables. Furthermore, the diameter of the integrated cable according to the present invention can be reduced to about 5 mm as compared with the video signal cable 58 of the conventional apparatus having a diameter of about 1 cm. Therefore, the presence of the cable for connecting the computer body and the coordinate detecting apparatus with the display unit to each other does not deteriorate the handling facility of the coordinate detecting apparatus with the display unit. As a result, the handling facility of the coordinate detecting apparatus with the display unit as the input unit and the display unit can be significantly improved.

Furthermore, since the coordinate detecting apparatus 11 with the display unit, the size of which is minimized, is disposed in the frame 56, the thickness of the frame 56 can be reduced satisfactorily. Therefore, it can be used as the desktop display device and/or an input device for inputting characters and figures in a cordless manner.

Then, an embodiment of the present invention with which the handling facility can further be improved will now be described.

FIGS. 12(a)–12(d) illustrate a fourth embodiment of the present invention. The fourth embodiment is constituted in such a manner that a foldable standing member 85 structured as shown in FIG. 12A is pivotally fastened to the reverse side of the frame 56 of the coordinate detecting apparatus 11 with the display unit. The coordinate detecting apparatus 11 with the display unit formed into the plate-like shape exhibits the excellent handling facility as described above. In a case where the function as the output unit is mainly used as compared with the function as the input unit, it is convenient that the angle, at which the standing member 85 is folded, is adjusted and the coordinate detecting apparatus 11 with the display unit is disposed away from an operator of the apparatus by a proper distance as shown in FIGS. 12B and 12C. In particular, a significant effect can be obtained in a case where there is a desire of also using a keyboard 86 as shown in FIG. 12D. The reason for this lies in that the working efficiency can be improved in the case where the keyboard 86 is placed adjacent to the operator of the apparatus and the coordinate detecting apparatus 11 with the display unit is stood erect at a position at which it can be seen by the operator. In this case, the operation of supplying data to the coordinate detecting apparatus 11 with the display unit by using a coordinate indicator 20 is performed in a manner of using a writing pen.

Furthermore, this embodiment is characterized in that a side surface 90 of the frame of the computer body 12 is arranged to have no operation switches, and input/output ports, and the like so as to be used in such a manner that the computer body 12 is stood erect on a disk or the like as shown in FIG. 12D.

Figure 13:
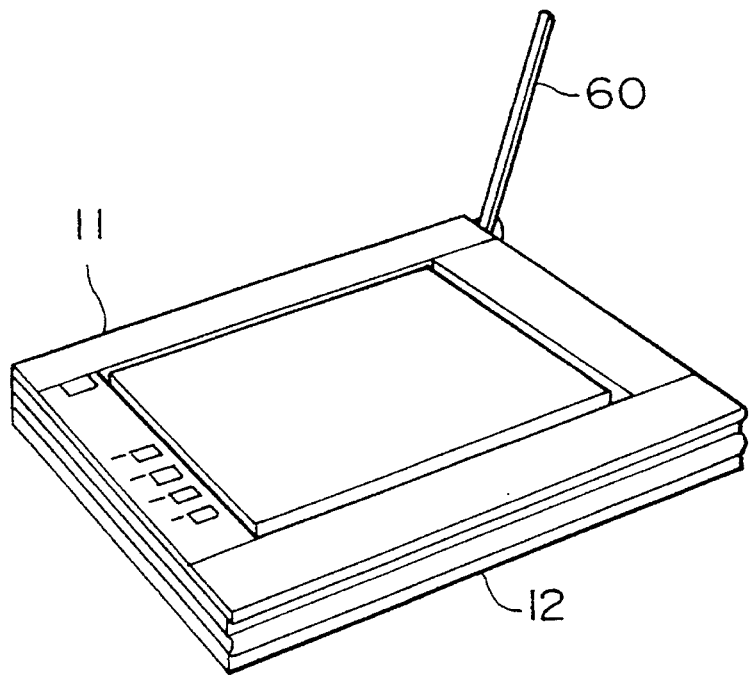
FIG. 13 is a perspective view which illustrates a fifth embodiment of the present invention.

FIG. 13 is a perspective view which illustrates a fifth embodiment of the present invention in which the size of the frame 56 of the coordinate detecting apparatus 11 with the display unit and size of the computer body 12 are made to be substantially the same. For example, both of the coordinate detecting apparatus 11 with the display unit and the computer body 12 can be made to have a size of A4, Japanese Industrial Standard.

Hitherto, as the A4-size portable personal computer, a so-called notebook personal computer has been known which is constituted in such a manner that one of the two sides which correspond to the spread two pages of a book has a keyboard input side and a display scope is formed on another side and which is carried in such a manner that the two sides are superposed.

The coordinate detecting apparatus with the display unit according to the present invention and a computer body connected to the same formed into a compact shape having, for example, the A4 size in the manner according to the fifth embodiment of the present invention can be used in such a manner that the coordinate detecting apparatus 11 with the display unit is superposed on the computer body 12 as shown in FIG. 13 or can be used in such a manner that the computer body 12 and the coordinate detecting apparatus 11 with the display unit are separated from each other in the manner according to the fourth embodiment as compared with the conventional notebook personal computers which has been integrally constituted and which cannot be used in such a manner that a portion of the apparatus is separated from the body. Therefore, it can be easily carried and also the handling facility can be improved. Referring to the drawing, reference numeral 60 represents a coordinate indicator.

Figure 14A:
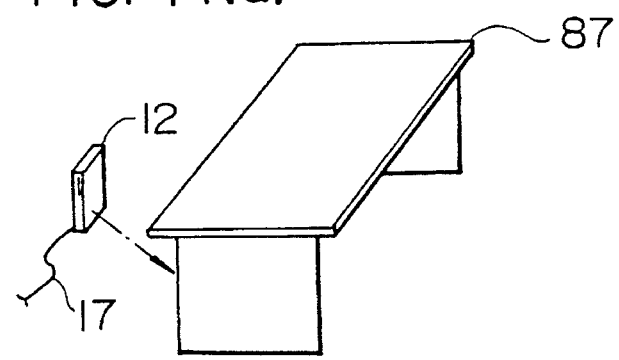
FIGS. 14(a) and 14(b) are perspective views which illustrates a sixth embodiment of the present invention.
Figure 14B:
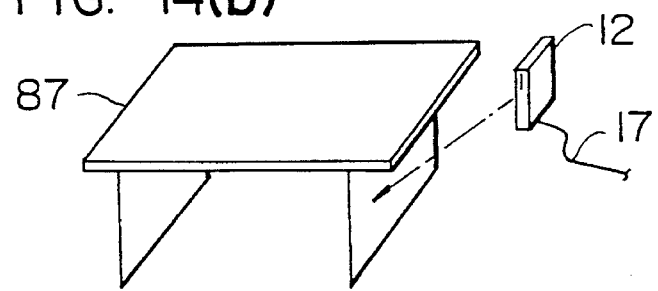

FIGS. 14(a) and 14(b) are a perspective view which illustrates a sixth embodiment of the present invention which is arranged in such a manner that a metal fastener or a magnetic sheet or the like is disposed on the reverse side of the frame of the computer body 12. Since the computer body 12 can be fastened to the side surface or the backside of a disk 87, the space above the disk can be freely utilized and therefore the handling facility of the coordinate detecting apparatus 11 with the display unit can be improved.

Since the coordinate detecting apparatus with the display unit according to the present invention is not directly connected to a power supply device such as a power supply adapter, excellent handling facility can be realized and the apparatus can be easily operated. Furthermore, the coordinate detecting apparatus with the display unit and the control unit (the computer body) or the interface can be connected to each other by one integrated connection cable having a diameter of about 5 mm. Therefore, the limit present in handling the conventional apparatus which must use a plurality of connection cables can be overcome and thereby the handling facility of the apparatus can be significantly improved.

Furthermore, by forming the frame of the coordinate detecting apparatus with the display unit into a plate-like shape, it can be used as input equipment with which data can be input by hand writing to the control unit on a disk or the like, causing the handling facility to be improved. In addition, by providing a standing member, which can be folded, on the reverse side or the side surface of the frame of the coordinate detecting apparatus with the display unit, it can be used as output equipment which displays the contents of the operation performed in the control unit in a real time manner on a disk or the like, causing the handling facility to be improved.

Furthermore, by forming the frame of the control unit into a box-like shape having a size substantially the same as that of the frame of the coordinate detecting apparatus with the display unit, the coordinate detecting apparatus with the display unit can be superposed on the control unit or the control unit can be separated from it at the time of the operation. Therefore, the handling facility of the coordinate detecting apparatus with the display unit can be improved. In addition, at least one of the side surfaces of the frame of the control unit is formed into a shape having no operation switch and the input/output ports and the like. Therefore, the control unit can be stood erect while making the aforesaid side face downwards if necessary at the time of the operation. Therefore, the handling facility of the coordinate detecting apparatus with the display unit can be improved. In addition, by providing a member such as a metal fastener or a magnetic sheet on the reverse side of the frame of the control unit, the control unit can be disposed on the side surface or the backside of a disk. Therefore, the operable space on the disk can be enlarged and therefore the handling facility of the coordinate detecting apparatus with the display unit can be improved.

Furthermore, by disposing the display unit control means on the control unit or the interface board in place of disposing it in the coordinate detecting apparatus with the display unit, the transferring frequency can be lowered and the circuit for the display unit control means can be further freely designed.

In addition, by disposing a compression means for compressing data about the contents to be displayed on the control unit or the interface board and disposing data restoring means in the coordinate detecting apparatus with the display unit, the computer body and the coordinate detecting apparatus with the display unit can be connected to each other by only one cable of the same specification even if the display unit is a low resolution type, an intermediate resolution type, a high resolution type, a monochrome type or a color type display unit.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A coordinate detecting apparatus including a display unit having a separate control unit;

the display unit displaying data about contents to be displayed and being superposed on a coordinate detecting unit for converting coordinate information supplied from said display unit into coordinate data; and said control unit transmitting and receiving the data about the contents to be displayed and said coordinate data to and from a portion of said coordinate detecting apparatus including said display unit superposed on said coordinate detecting unit, said control unit being separate from said portion, said coordinate detecting apparatus comprising:

a display unit control means, disposed in said control unit, for transferring a graphic control signal as said data about the contents to be displayed to said display unit, said graphic control signal directly controlling said display unit;

a driving power source disposed in said control unit, the driving power source being connected to drive said display unit and said coordinate detecting unit, said portion of said coordinate detecting apparatus including said display unit superposed on said coordinate detecting unit and said control unit being connected to each other by a common integrated cable including at least a signal line for transferring said graphic control signal to said display unit, a signal line for transferring the coordinate data of said coordinate detecting unit, and a power line for transferring power from said driving power source to said display unit and said coordinate detecting unit.

2. A coordinate detecting apparatus according to claim 1, wherein said control unit includes a compressing circuit for compressing said data about the contents to be displayed to transfer it to said portion of said coordinate detecting apparatus including said display unit superposed on said coordinate detecting unit by increasing a data transfer rate without increasing or decreasing the amount of data, and said portion of said coordinate detecting apparatus including said display unit superposed on said coordinate detecting unit including a restoring circuit for restoring compressed data about the contents to be displayed by decreasing the data transfer rate.

3. A coordinate detecting apparatus according to claim 1, wherein said portion of said coordinate detecting apparatus including said display unit superposed on said coordinate detecting unit is accommodated in a thin frame.

4. A coordinate detecting apparatus according to claim 3, wherein said frame which accommodates said portion of said coordinate detecting apparatus including said display unit superposed on said coordinate detecting unit has a pivotally fastened foldable standing member on a bottom side or a side surface thereof.

5. A coordinate detecting apparatus according to claim 1, wherein said control unit is accommodated in a frame at least one side surface of which is formed as a plane.

6. A coordinate detecting apparatus according to claim 5, wherein holding means for holding said frame of said control unit on the surface of a disk is provided on a bottom side of said frame of said control unit.

7. A coordinate detecting apparatus according to claim 5, wherein the size of one side of a frame accommodating said portion of said coordinate detecting apparatus including said display unit superposed on said coordinate detecting unit and that of said at least one side surface of said frame of said control unit are made to be substantially the same.

8. A coordinate detecting apparatus according to claim 1 wherein at least control data, data about the contents to be displayed and power for driving said display unit, and control data, coordinate data and power for driving said coordinate detecting unit are transmitted and received through one input/output port and said common integrated cable.

9. A coordinate detecting apparatus according to claim 1, wherein said display unit comprises a liquid crystal display, said graphic control signal comprises a digital graphic control signal and said display unit control means comprises a liquid crystal controller outputting said digital graphic control signal.

10. A coordinate detecting apparatus including a display unit having a separate control unit:

the display unit displaying data about contents to be displayed and being superposed on a coordinate detecting unit for converting coordinate information supplied from said display unit into coordinate data; and said control unit for transmitting and receiving data about the contents to be displayed and said coordinate data to and from a portion of said coordinate detecting apparatus including said display unit superposed on said coordinate detecting unit, said control unit being separate from said portion, said coordinate detecting apparatus comprising:

a power source and an interface board located in a portion including said control unit, said power source being connected for supplying power to each of a plurality of circuits in said control unit, and said interface board being insertable into an extension slot of said control unit, said interface board having display unit control means, said display unit control means being disposed in said control unit, for transferring a graphic control signal as said data about the contents to be displayed to said display unit, said graphic control signal directly controlling said display unit;

a power supply circuit located in said interface board for supplying driving power from said power source to said display unit and said coordinate detecting unit as driving power source, said portion of said coordinate detecting apparatus including said display unit superposed on said coordinate detecting unit and said interface board being connected to each other by a common integrated cable including at least a signal line for transferring said graphic control signal to said display unit, a signal line for transferring the coordinate data of said coordinate detecting unit, and a power line for transferring power from said power supply circuit to said display unit and said coordinate detecting unit.

11. A coordinate detecting apparatus according to claim 10, wherein said interface board includes a compressing circuit for compressing said data about the contents to be displayed to transfer it to said portion of said coordinate detecting apparatus including said display unit superposed on said coordinate detecting unit by increasing a data transfer rate without increasing or decreasing the amount of data, and said portion of said coordinate detecting apparatus including said display unit superposed on said coordinate detecting unit including a restoring circuit for restoring compressed data about the contents to be displayed by decreasing the data transfer rate.

12. A coordinate detecting apparatus according to claim 10, wherein said portion of said coordinate detecting apparatus including said display unit superposed on said coordinate detecting unit is accommodated in a thin frame.

13. A coordinate detecting apparatus according to claim 12, wherein said frame which accommodates said portion of said coordinate detecting apparatus including said display unit superposed on said coordinate detecting unit has a pivotally fastened foldable standing member on a bottom side or a side surface thereof.

14. A coordinate detecting apparatus according to claim 10, wherein said control unit is accommodated in a frame at least one side surface of which is formed as a plane.

15. A coordinate detecting apparatus according to claim 13, wherein holding means for holding said frame of said control unit on the surface of a disk is provided on a bottom side of said frame of said control unit.

16. A coordinate detecting apparatus according to claim 14, wherein the size of one side of a frame accommodating said portion of said coordinate detecting apparatus including said display unit superposed on said coordinate detecting unit and that of said at least one side surface of said frame of said control unit are made to be substantially the same.

17. A coordinate detecting apparatus according to claim 10, wherein said display unit comprises a liquid crystal display, said graphic control signal comprises a digital graphic control signal and said display unit control means comprises a liquid crystal controller outputting said digital graphic control signal.

18. A coordinate detecting apparatus with a display unit for displaying data about contents to be displayed, said display unit being superposed on a coordinate detecting unit and said coordinate detecting unit converting coordinate information supplied from said display unit into coordinate data, comprising:

a common integrated cable for connecting said coordinate detecting apparatus with said display unit to a control unit, said control unit transmitting and receiving data about the contents to be displayed and said coordinate data to and from said coordinate detecting apparatus, said common integrated cable including (a) a signal line for transferring a graphic control signal as the data about contents to be displayed to said display unit, said graphic control signal directly controlling said display unit, and (b) a signal line for transferring the coordinate data of said coordinate detecting unit, driving power for driving said display unit and said coordinate detecting unit being supplied from said control unit via said integrated cable.

19. A coordinate detecting apparatus according to claim 18 further comprising a restoring circuit for restoring said data about the contents to be displayed which has been compressed by increasing a data transfer rate without increasing or decreasing the amount of data and transferred.

20. A coordinate detecting apparatus according to claim 18, wherein said coordinate detecting apparatus is accommodated in a thin frame.

21. A coordinate detecting apparatus according to claim 20, wherein said frame which accommodates said coordinate detecting apparatus has a pivotally fastened foldable standing member on a bottom side or a side surface thereof.

22. A coordinate detecting apparatus with a display unit according to claim 18 wherein at least control data, data about the contents to be displayed and power for driving said display unit, and control data, coordinate data and power for driving said coordinate detecting unit are transmitted and received through one input/output port and said common integrated cable.

23. A coordinate detecting apparatus according to claim 18, wherein said display unit comprises a liquid crystal display, said graphic control signal comprises a digital graphic control signal and said display unit control means comprises a liquid crystal controller outputting said digital graphic control signal.

24. A control unit for transmitting and receiving data about the contents to be displayed and coordinate data to and from a coordinate detecting apparatus with a display unit for displaying data about contents to be displayed, said display unit being superposed on a coordinate detecting unit and said coordinate detecting unit converting coordinate information supplied from said display unit into coordinate data, said control unit being separate from said coordinate detecting apparatus with said display unit, said control unit comprising:

display unit control means for transferring a graphic control signal as said data about contents to be displayed to said display unit, said graphic control signal directly controlling said display unit;

a driving power source arranged to drive said display unit and said coordinate detecting unit, said control unit being connected to said coordinate detecting apparatus with said display unit by a common integrated cable including at least (a) a signal line for transferring said graphic control signal to said display unit, (b) a signal line for transferring the coordinate data of said coordinate detecting unit, and (c) a power line for transferring power to said display unit and said coordinate detecting unit from said driving power source.

25. A control unit according to claim 24, wherein at least control data, data about the contents to be displayed and power for driving said display unit and control data, coordinate data and power for driving said coordinate detecting unit are transmitted and received through one input/output port.

26. A control unit according to claim 24 further comprising a compressing circuit for compressing said data about the contents to be displayed to transfer it to said coordinate detecting apparatus with said display unit by increasing a data transfer rate without increasing or decreasing the amount of data.

27. A control unit according to claim 24, wherein said control unit is accommodated in a frame at least one side surface of which is formed as a plane.

28. A control unit according to claim 27, wherein holding means for holding said frame of said control unit on the surface of a disk is provided on a bottom side of said frame of said control unit.

29. A control unit according to claim 28, wherein the size of a bottom side of a frame of said coordinate detecting apparatus with said display unit and that of a surface of said frame of said control unit are made to be substantially the same.

30. A control unit according to claim 24, wherein said display unit comprises a liquid crystal display, said graphic control signal comprises a digital graphic control signal and said display unit control means comprises a liquid crystal controller outputting said digital graphic control signal.

31. An interface board which can be inserted into an extension slot of a control unit, said interface board transmitting and receiving data about the contents to be displayed and coordinate data to and from a coordinate detecting apparatus with a display unit for displaying data about contents to be displayed, said display unit being superposed on a coordinate detecting unit and said coordinate detecting unit converting coordinate information supplied from said display unit into coordinate data, said control unit being separate from said coordinate detecting apparatus with said display unit, said interface board comprising:

a display unit control means for transferring a graphic control signal as said data about contents to be displayed to said display unit, said graphic control signal directly controlling said display unit, a power supply circuit for supplying power from a power source of said control unit to said display unit and said coordinate detecting unit as a driving power source.

32. An interface board according to claim 31, wherein at least control data, data about the contents to be displayed and power for driving said display unit and control data, coordinate data and power for driving said coordinate detecting unit are transmitted and received through one input/output port.

33. An interface board according to claim 31 further comprising a compressing circuit for compressing said data about the contents to be displayed by increasing a data transfer rate without increasing or decreasing the amount of data to transfer it to said coordinate detecting apparatus with said display unit.

34. An interface board according to claim 31, wherein said display unit comprises a liquid crystal display, said graphic control signal comprises a digital graphic control signal and said display unit control means comprises a liquid crystal controller outputting said digital graphic control signal.

35. A coordinate detecting apparatus with a display unit of a type having a separate control unit, in which said display unit displays data about contents to be displayed and said display unit is superposed on a coordinate detecting unit for converting coordinate information supplied from said display unit into coordinate data; and said control unit transmits and receives data about the contents to be displayed and said coordinate data to and from a portion of said coordinate detecting apparatus including said display unit superposed on said coordinate detecting unit, said control unit being separate from said portion, said coordinate detecting apparatus comprising:

a lighting unit for lighting up said display unit from the rear or the side thereof, display unit control means and a driving power source located in a portion including said control unit, the display unit control means transferring a graphic control signal as said data about contents to be displayed to said display unit, said graphic control signal directly controlling said display unit, and the driving power source being arranged for driving said lighting unit, said display unit and said coordinate detecting unit, said portion of said coordinate detecting apparatus including said display unit superposed on said coordinate detecting unit and said control unit being connected to each other by a common integrated cable including at least a signal line for transferring said graphic control signal to said display unit, a signal line for transferring the coordinate data of said coordinate detecting unit, and a power line for transferring power from said driving power source to said lighting unit, said display unit and said coordinate detecting unit.

36. A coordinate detecting apparatus according to claim 35, wherein said display unit comprises a liquid crystal display, said graphic control signal comprises a digital graphic control signal and said display unit control means comprises a liquid crystal controller outputting said digital graphic control signal.

37. A coordinate detecting apparatus with a display unit of a type having a separate control unit, in which said display unit displays data about contents to be displayed and said display unit is superposed on a coordinate detecting unit for converting coordinate information supplied from said display unit into coordinate data; and said control unit transmits and receives data about the contents to be displayed and said coordinate data to and from a portion of said coordinate detecting apparatus including said display unit superposed on said coordinate detecting unit, said control unit being separate from said portion of said coordinate detecting apparatus with said display unit;

said coordinate detecting apparatus comprising:

a portion including said control unit, said control unit having a display unit control means for transferring a graphic control signal as said data about the contents to be displayed to said display unit, said graphic control signal directly controlling said display unit.

38. A coordinate detecting apparatus according to claim 37, wherein said display unit comprises a liquid crystal display, said graphic control signal comprises a digital graphic control signal and said display unit control means comprises a liquid crystal controller outputting said digital graphic control signal.

39. In combination, a first housing including:
(a) a tablet having two coordinate directions for detecting coordinates of an object in the two coordinate directions and for deriving tablet output signals indicative of the object position in said two coordinate directions,
(b) a controller connected to the tablet for supplying control signals to the tablet and responding to the tablet output signals to derive a serial signal indicative of the position of the object in said two coordinate directions,
(c) a two coordinate display for the two coordinate directions of the tablet, the display providing a graphic display of the object in the two coordinate directions in response to a digital signal having a bandwidth less than that of a video signal, and
(d) a power supply circuit for converting a DC input voltage into DC power supply voltages for the display and the controller;

a second housing including:
(a) a power source for deriving the DC input voltage for the power supply circuit,
(b) a signal bus,
(c) a serial signal controller for deriving input signals for the controller of the first housing and responsive to the serial signal indicative of the object position in said two coordinate directions, the serial signal controller supplying the bus with a signal indicative of the object position in said two coordinate directions,
(d) a controller for the display responsive to the signal on the bus indicative of the object position in said two coordinate directions for deriving the digital signal having a bandwidth less than that of a video signal and indicative of the object position in the two coordinate directions; and an integrated cable connected between the first and second housings including first, second and third lines, the first line being connected between the power source and the power supply circuit for supplying the DC input voltage to the power supply circuit from the power source, the second line being connected between the serial signal controller and the controller of the first housing for coupling the serial signal indicative of the object position from the controller of the first housing to the serial signal controller and for coupling the input signal for the controller of the first housing from the serial signal controller to the controller of the first housing, the third line being connected between the controller for the display and the display for coupling the digital signal from the controller for the display to the display.

40. An apparatus according to claim 39, wherein said first housing is supported by a foldable standing member pivotally fastened to a side thereof such that an operator can variably position said first housing during operation of the apparatus.

41. An apparatus according to claim 39, wherein said second housing is located separate from said first housing and said integrated cable mutually and externally interconnects said first and second housings.

42. A method of using a coordinate detecting apparatus having a first coordinate detecting and output display housing and a second power supply and signal control housing, said first and second housings being mutually interconnected by a single integrated cable including at least first, second and third lines, said method comprising the steps of:

detecting coordinates of an object position in said first housing in two coordinate directions and deriving input signals indicative of said object position in said two coordinate directions;

processing said input signals in said first housing to derive graphic control signals;

electronically transmitting said graphic control signals from said first housing to said second housing, said electronic transmittance occurring via said second line of said integrated cable at a graphic control signal transmittal frequency less than that of a video signal;

controlling and enhancing said graphic control signals in said second housing according to a program of a computer to generate serial signals;

supplying electric power to said first housing from said second housing, said supplying of electric power occurring via said first line of said integrated cable;

electronically transmitting said serial signals from said second housing to said first housing via said third line of said integrated cable at a serial signal transmittal frequency;

processing said digital serial signals in said first housing to derive coordinate display signals; and displaying said display signals on an output display in said first housing.

43. A method according to claim 42, wherein said graphic control signals and said serial signals are digital signals.

44. The method according to claim 42, wherein said graphic control signal transmittal frequency and said serial signal transmittal frequency are greater than 1 Mhz and less than 15 Mhz.

45. A method according to claim 43, wherein said graphic control signal transmittal frequency is greater than 1 Mhz and less than 15 Mhz and said serial signal transmittal frequency is more than 29 Mhz.

46. In combination, a first housing including:
  (a) a tablet having two coordinate directions for detecting coordinates of an object in the two coordinate directions and for deriving tablet output signals indicative of the object position in said two coordinate directions,
  (b) a controller connected to the tablet for supplying control signals to the tablet and responding to the tablet output signals to derive a serial signal indicative of the position of the object in said two coordinate directions,
  (c) a two coordinate display for the two coordinate directions of the tablet, the display providing a graphic display of the object in the two coordinate directions in response to a digital signal, and
  (d) a power supply circuit for converting a DC input voltage into DC power supply voltages for the display and the controller;

a second housing including:
  (a) a power source for deriving the DC input voltage for the power supply circuit,
  (b) a signal bus,
  (c) a serial signal controller for deriving input signals for the controller of the first housing and responsive to the serial signal indicative of the object position in said two coordinate directions, the serial signal controller supplying the bus with a signal indicative of the object position in said two coordinate directions,
  (d) a controller for the display responsive to the signal on the bus indicative of the object position in said two coordinate directions for deriving the digital signal indicative of the object position in the two coordinate directions; and an integrated cable connected between the first and second housings including first, second and third lines, the first line being connected between the power source and the power supply circuit for supplying the DC input voltage to the power supply circuit from the power source, the second line being connected between the serial signal controller and the controller of the first housing for coupling the serial signal indicative of the object position from the controller of the first housing to the serial signal controller and for coupling the input signal for the controller of the first housing from the serial signal controller to the controller of the first housing, the third line being connected between the controller for the display and the display for coupling the digital signal from the controller for the display to the display.

47. An apparatus according to claim 46, wherein said first housing is supported by a foldable standing member pivotally fastened to a side thereof such that an operator can variably position said first housing during operation of the apparatus.

48. An apparatus according to claim 46, wherein said second housing is located separate from said first housing and said integrated cable mutually and externally interconnects said first and second housings.

49. A method for use in a coordinate detecting apparatus having a first coordinate detecting and output display housing and a second power supply and signal control housing, said first and second housings mutually interconnected by a single integrated cable including at least first, second and third lines, said method comprising the steps of:

detecting coordinates of an object position in said first housing in two coordinate directions and deriving input signals indicative of said object position in said two coordinate directions;

processing said input signals in said first housing to derive serial signals;

electronically transmitting said serial signals from said first housing to said second housing, said electronic transmittance occurring via said second line of said integrated cable;

controlling said serial signals in said second housing according to a program of a computer to generate a graphic control signal;

supplying electric power to said first housing from said second housing, said supplying of electric power occurring via said first line of said integrated cable;

electronically transmitting said graphic control signal from said second housing to said first housing via said third line of said integrated cable at a graphic control signal transmittal frequency; and displaying said graphic control signal on an output display in said first housing.

50. A method according to claim 49, wherein said graphic control signals are digital signals.

51. A method according to claim 49, wherein said graphic control signal transmittal frequency is greater than 1 Mhz and less than 15 Mhz.

* * * * *